(12) United States Patent
Zhu et al.

(10) Patent No.: US 11,978,583 B2
(45) Date of Patent: May 7, 2024

(54) COIL MODULE, WIRELESS CHARGING TRANSMITTING APPARATUS, WIRELESS CHARGING RECEIVING APPARATUS, WIRELESS CHARGING SYSTEM, AND MOBILE TERMINAL

(71) Applicant: Huawei Technologies Co., Ltd., Shenzhen (CN)

(72) Inventors: Yongfa Zhu, Dongguan (CN); Xiaowei Chen, Dongguan (CN); Tao Ding, Dongguan (CN); Zhiqiang Zeng, Dongguan (CN); Chang Yang, Dongguan (CN); Zhaodong He, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 774 days.

(21) Appl. No.: 17/158,538

(22) Filed: Jan. 26, 2021

(65) Prior Publication Data

US 2021/0151250 A1    May 20, 2021

Related U.S. Application Data

(63) Continuation of application No. PCT/CN2019/110297, filed on Oct. 10, 2019.

(30) Foreign Application Priority Data

Feb. 28, 2019    (CN) .......................... 201910151680.X

(51) Int. Cl.
*H02J 7/00*       (2006.01)
*H01F 27/28*      (2006.01)
(Continued)

(52) U.S. Cl.
CPC ......... *H01F 38/14* (2013.01); *H01F 27/2871* (2013.01); *H01F 27/36* (2013.01); *H02J 7/04* (2013.01); *H02J 50/10* (2016.02)

(58) Field of Classification Search
USPC .......................... 320/106, 107, 108, 109, 110
See application file for complete search history.

(56) References Cited

U.S. PATENT DOCUMENTS

2011/0050380 A1    3/2011    Nakanishi
2013/0307469 A1   11/2013    Kuroda et al.
(Continued)

FOREIGN PATENT DOCUMENTS

CN    107046333 A    8/2017
CN    107068357 A    8/2017
(Continued)

OTHER PUBLICATIONS

Kim, J., et al., "New Structure for High Q-Factor Printed Antenna in Wireless Power Transmission," IEEE Eurocon 2017, Jul. 6-8, 2017, Ohrid, R. Macedonia, 5 pages.

*Primary Examiner* — Brian Ngo
(74) *Attorney, Agent, or Firm* — Conley Rose, P.C.

(57) ABSTRACT

A coil module includes a first planar coil winding that includes a plurality of turns of coils, at least one turn of first coil in the plurality of turns of coils includes at least one first cutting opening, and the first cutting opening divides the first coil into a first outer side part and a first inner side part along an extension direction of the coil, and a first target side part includes a first cutting groove, the first target side part is at least one of the first outer side part and the first inner side part, an extension direction of the first cutting groove is the same as an extension direction of the first target side part, and a width of a single first cutting groove is less than or equal to a width of a single first cutting opening.

20 Claims, 30 Drawing Sheets

(51) Int. Cl.
*H01F 27/36* (2006.01)
*H01F 38/14* (2006.01)
*H02J 7/04* (2006.01)
*H02J 50/10* (2016.01)

(56) References Cited

U.S. PATENT DOCUMENTS

| | | |
|---|---|---|
| 2016/0094082 A1 | 3/2016 | Ookawa et al. |
| 2017/0179773 A1 | 6/2017 | Kim et al. |
| 2017/0229900 A1 | 8/2017 | Cho et al. |
| 2017/0278619 A1 | 9/2017 | Lee et al. |
| 2018/0358174 A1 | 12/2018 | Komachi et al. |
| 2020/0279686 A1 | 9/2020 | Pei et al. |
| 2020/0312533 A1* | 10/2020 | Mori .................. H01F 27/255 |
| 2021/0012595 A1* | 1/2021 | Kim .................. G07C 9/28 |
| 2021/0012959 A1 | 1/2021 | Pei et al. |
| 2021/0151247 A1* | 5/2021 | Zhu .................. H02J 50/402 |

FOREIGN PATENT DOCUMENTS

| | | |
|---|---|---|
| CN | 108133808 A | 6/2018 |
| CN | 108321914 A | 7/2018 |
| CN | 207651331 U | 7/2018 |
| CN | 108565102 A | 9/2018 |
| CN | 109087791 A | 12/2018 |
| CN | 109887724 A | 6/2019 |
| CN | 109961942 A | 7/2019 |
| JP | 2002043130 A | 2/2002 |
| KR | 20170072773 A | 6/2017 |
| TW | 201320121 A | 5/2013 |
| WO | 2019231168 A1 | 12/2019 |

* cited by examiner

COIL MODULE, WIRELESS CHARGING TRANSMITTING APPARATUS, WIRELESS CHARGING RECEIVING APPARATUS, WIRELESS CHARGING SYSTEM, AND MOBILE TERMINAL

CROSS-REFERENCE TO RELATED APPLICATIONS

This application is a continuation application of International Patent Application No. PCT/CN2019/110297 filed on Oct. 10, 2019, which claims priority to Chinese Patent Application No. 201910151680.X filed on Feb. 28, 2019, both of which are hereby incorporated by reference in their entireties.

TECHNICAL FIELD

This application relates to the field of power electronic technologies, and in particular, to a coil module, a wireless charging transmitting apparatus, a wireless charging receiving apparatus, a wireless charging system, and a mobile terminal.

BACKGROUND

Currently, charging an electronic device by using a wireless charging technology is increasingly popular, and a device that implements the wireless charging technology is referred to as a wireless charger. During specific implementation, a transmitting coil is disposed in the wireless charger, a receiving coil is disposed in the electronic device, an alternating current carried by the transmitting coil in the wireless charger generates a magnetic field, and the receiving coil in the electronic device generates a voltage through magnetic coupling, so as to charge the electronic device.

It may be understood that a wireless charging coil may be the transmitting coil or the receiving coil. Energy is transferred between the transmitting coil and the receiving coil through an alternating magnetic field.

Currently, a conducting wire of the wireless charging coil is relatively wide, and an effective area in which the magnetic field passes through the conducting wire is relatively large. Therefore, a conducting wire with a relatively large area corresponds to a relatively large passing-through magnetic flux, and consequently an eddy current loss generated on the conducting wire is relatively large, resulting in relatively low wireless charging efficiency.

SUMMARY

To resolve the foregoing technical problem, this application provides a coil module, to reduce an eddy current loss in a planar coil winding to some extent, and further increase wireless charging efficiency. In addition, this application further provides a wireless charging transmitting apparatus, a wireless charging receiving apparatus, a wireless charging system, and a mobile terminal that use the coil module.

According to a first aspect, a coil module is provided, including a first planar coil winding. The first planar coil winding includes a plurality of turns of coils. At least one turn of first coil in the plurality of turns of coils of the first planar coil winding includes at least one first cutting opening, and the first cutting opening divides the first coil into a first outer side part and a first inner side part along an extension direction of the coil. The first outer side part has a first connection end, and the first inner side part has a second connection end. A first target side part includes a first cutting groove. The first target side part is at least one of the first outer side part and the first inner side part. An extension direction of the first cutting groove is the same as an extension direction of the first target side part. A width of a single first cutting groove is less than or equal to a width of a single first cutting opening.

The first connection end and the second connection end are used for a cross-connection to another planar coil winding. The cross-connection can reduce a circulating current loss and increase wireless charging efficiency.

With reference to the first aspect, in a first possible implementation, at least one turn of second coil in the plurality of turns of coils of the first planar coil winding includes only a first cutting groove. A width of the first cutting groove may be as small as possible, so that when a magnetic field cuts the winding, an eddy current path of the first target side part is cut off while an increase in a direct current resistance is avoided as far as possible, and an effective area in which a magnetic flux passes through the coil winding is reduced. In this way, the magnetic flux passing through the coil winding is reduced, and an eddy current loss in the first planar coil winding is further reduced. Therefore, the first planar coil winding can not only reduce the eddy current loss, but also reduce the circulating current loss, thereby increasing overall charging efficiency during wireless charging. A specific processing method for processing the first cutting groove on the first planar coil winding may be a process such as a laser cutting process or a plasma cutting process. In this embodiment, the second coil includes only the first cutting groove, and does not include the first cutting opening. Therefore, a process procedure is saved. Only the first cutting groove is used to reduce the eddy current loss. Because the width of the first cutting groove is relatively small, utilization of a coil conductor can be increased.

With reference to the first aspect or the foregoing possible implementation, in a second possible implementation, the first cutting groove penetrates the first target side part along the extension direction of the first target side part, or a plurality of first cutting grooves are distributed along the extension direction of the first target side part, and two adjacent first cutting grooves are separated from each other. Both the penetration and division are concepts for one side part, and the side part may be the first outer side part or the first inner side part.

With reference to any one of the first aspect or the foregoing possible implementations, in a third possible implementation, when the plurality of first cutting grooves are distributed along the extension direction of the first target side part, the plurality of first cutting grooves are evenly distributed in an extension direction of the coil. Even distribution facilitates production and manufacturing, saves a process procedure, and reduces costs.

The even distribution means that every two adjacent first cutting grooves in the plurality of first cutting grooves are equally spaced.

Further, the even distribution may further mean that lengths and widths of the plurality of first cutting grooves are the same.

With reference to any one of the first aspect or the foregoing possible implementations, in a fourth possible implementation, the first cutting groove is a blind groove or a through groove. The through groove is a cutting groove whose cutting depth is the same as a thickness of a coil, that is, a cutting groove that completely cuts through the coil along a thickness direction of the coil. The blind groove is a cutting groove whose cutting depth is less than a thickness of a coil, that is, a cutting groove that does not cut through the coil.

With reference to any one of the first aspect or the foregoing possible implementations, in a fifth possible implementation, the first outer side part includes at least two first cutting grooves, and a sum of widths of the at least two first cutting grooves is less than or equal to the width of the single first cutting opening.

With reference to any one of the first aspect or the foregoing possible implementations, in a sixth possible implementation, the first inner side part includes at least two first cutting grooves, and a sum of widths of the at least two first cutting grooves is less than or equal to the width of the single first cutting opening.

Preferably, a sum of widths of at least two first cutting grooves is less than the width of the single first cutting opening. The first cutting opening needs to ensure that the first inner side part and the first outer side part are effectively disconnected, but the first cutting groove does not need to ensure that the two divided parts are effectively disconnected. Therefore, the width of the first cutting groove may be relatively small. The first cutting groove is as thin as possible. In this way, waste of a winding material can be reduced, and utilization of the winding material can be increased. In addition, more first cutting grooves can be obtained through cutting at a same width, thereby reducing an eddy current loss to a greater extent.

With reference to any one of the first aspect or the foregoing possible implementations, in a seventh possible implementation, because the first cutting groove does not need to completely separate two divided strands, the first cutting groove may be very thin, and may be cut through laser cutting or plasma cutting.

With reference to any one of the first aspect or the foregoing possible implementations, in an eighth possible implementation, the coil module further includes a second planar coil winding. At least one turn of third coil in a plurality of turns of coils of the second planar coil winding includes at least one second cutting opening, and the second cutting opening divides the third coil into a second outer side part and a second inner side part along an extension direction of the coil. The second outer side part has a third connection end, and the second inner side part has a fourth connection end. The first connection end is connected to the fourth connection end, and the second connection end is connected to the third connection end, to implement a serial cross-connection or a parallel cross-connection between the first planar coil winding and the second planar coil winding.

The serial cross-connection or the parallel cross-connection between the two planar coil windings can reduce a circulating current loss of the entire coil module, and the first planar coil winding includes both the cutting groove and the cutting opening. Therefore, an eddy current loss can be further reduced, so that an overall loss can be reduced, and charging efficiency can be increased.

It should be noted that the term "third coil" herein is intended to distinguish from the first coil and the second coil that are located in the first planar coil winding, and has no other intentions. Therefore, the third coil herein should not constitute a limitation on the coil.

With reference to any one of the first aspect or the foregoing possible implementations, in a ninth possible implementation, a second target side part includes a second cutting groove, the second target side part is at least one of the second outer side part and the second inner side part, an extension direction of the second cutting groove is the same as an extension direction of the second target side part, and a width of a single second cutting groove is less than or equal to a width of a single second cutting opening.

Each of the two planar coil windings of the coil module includes one cutting groove and one cutting opening. Therefore, an eddy current loss can be reduced to a relatively great extent, so that an overall loss can be reduced, and charging efficiency can be increased.

With reference to any one of the first aspect or the foregoing possible implementations, in a tenth possible implementation, the first cutting opening and the second cutting opening overlap in a planar projection direction, where an overlapping proportion is greater than a first preset proportion, and the first cutting groove and the second cutting groove overlap in the planar projection direction, where an overlapping proportion is greater than a second preset proportion.

Optionally, the first preset proportion is 70%, 85%, or 90%.

Optionally, the second preset proportion is 70%, 85%, or 90%.

Other than the connection ends, an input terminal, and an output terminal, cutting grooves and cutting openings at other locations of the first planar coil winding and the second planar coil winding almost completely overlap, to maximize functions of the cutting openings and the cutting grooves. If overlapping proportions of the cutting grooves and the cutting openings on the two planar coil windings are relatively small, a coil on the other side corresponding to an opening groove location continues to be cut by a magnetic field, causing a loss. When overlapping proportions of the cutting grooves and the cutting openings on the two planar coil windings are relatively large, magnetic fluxes that pass through the cutting openings and cutting grooves at two opposite sides of a coil intersection can be kept basically the same, to achieve a better cancellation effect, and reduce losses to a maximum extent.

According to a second aspect, a wireless charging transmitting apparatus is provided, including an inverter circuit, a control unit, and any coil module described above. An input end of the inverter circuit is connected to a direct current power supply, an output end of the inverter circuit is connected to the coil module, under control of the control unit, the inverter circuit inverts a direct current output by the direct current power supply into an alternating current, and outputs the alternating current to the coil module, and the coil module is configured to transmit the alternating current in an alternating magnetic field manner.

The wireless charging transmitting apparatus includes the coil module described above. Therefore, an eddy current loss and a circulating current loss can be reduced, and electric energy transmitting efficiency can be increased.

According to a third aspect, a wireless charging receiving apparatus is provided, including a rectifier circuit, a control unit, a load, and any coil module described above. The coil module is configured to receive an alternating current in an alternating magnetic field manner, an input end of the rectifier circuit is connected to the coil module, and the rectifier circuit is configured to rectify the alternating current to a direct current under control of the control unit, and output the direct current to the load, to provide electric energy for the load.

The wireless charging receiving apparatus includes the coil module described above. Therefore, an eddy current loss and a circulating current loss can be reduced, and electric energy receiving efficiency can be increased.

According to a fourth aspect, a wireless charging system is provided, including the foregoing wireless charging transmitting apparatus and the foregoing wireless charging receiving apparatus. The wireless charging transmitting apparatus is configured to wirelessly charge the wireless charging receiving apparatus.

The wireless charging system includes the receiving apparatus and the transmitting apparatus that are described above. Therefore, an eddy current loss and a circulating current loss can be reduced, and charging efficiency for an electricity-consuming device can be increased.

According to a fifth aspect, a mobile terminal is provided. The mobile terminal includes a workload circuit, a rectifier circuit, a charging control unit, and any coil module described above. The coil module is configured to receive an alternating current in an alternating magnetic field manner, an input end of the rectifier circuit is connected to the coil module, and the rectifier circuit is configured to rectify the alternating current into a direct current under control of the charging control unit, and output the direct current to the workload circuit.

The mobile terminal includes the coil module described above. Therefore, an eddy current loss and a circulating current loss can be reduced, and charging efficiency can be increased.

It can be seen from the foregoing technical solutions that the embodiments of this application have the following advantages.

The coil module includes the first planar coil winding, and the first planar coil winding includes the plurality of turns of coils. The at least one turn of first coil in the plurality of turns of coils includes the at least one first cutting opening. The first cutting opening divides the first coil into the first outer side part and the first inner side part along the extension direction of the coil. Wire widths of the first outer side part and the first inner side part are less than a wire width of the before-division first planar coil winding. Therefore, an eddy current loss of the first planar coil winding can be reduced. In addition, the first connection end and the second connection end are used for a cross-connection to another planar coil winding, and the cross-connection can reduce a circulating current loss and increase wireless charging efficiency. Moreover, the first planar coil winding further includes the first cutting groove along the extension direction of the coil. The first cutting groove is formed on the first target side part. The first target side part is at least one of the first outer side part and the first inner side part, to be specific, a width of a coil obtained through dividing the first cutting groove is less than a width of the first target side part. The width of the first cutting groove may be as small as possible, so that when a magnetic field cuts the winding, an eddy current path of the first target side part is cut off while an increase in a direct current resistance is avoided as far as possible, and an effective area in which a magnetic flux passes through the coil winding is reduced. In this way, the magnetic flux passing through the coil winding is reduced, and an eddy current loss in the first planar coil winding is further reduced. Therefore, the first planar coil winding can not only reduce the eddy current loss, but also reduce a circulating current loss, thereby increasing overall charging efficiency during wireless charging.

DESCRIPTION OF EMBODIMENTS

Figure 1:
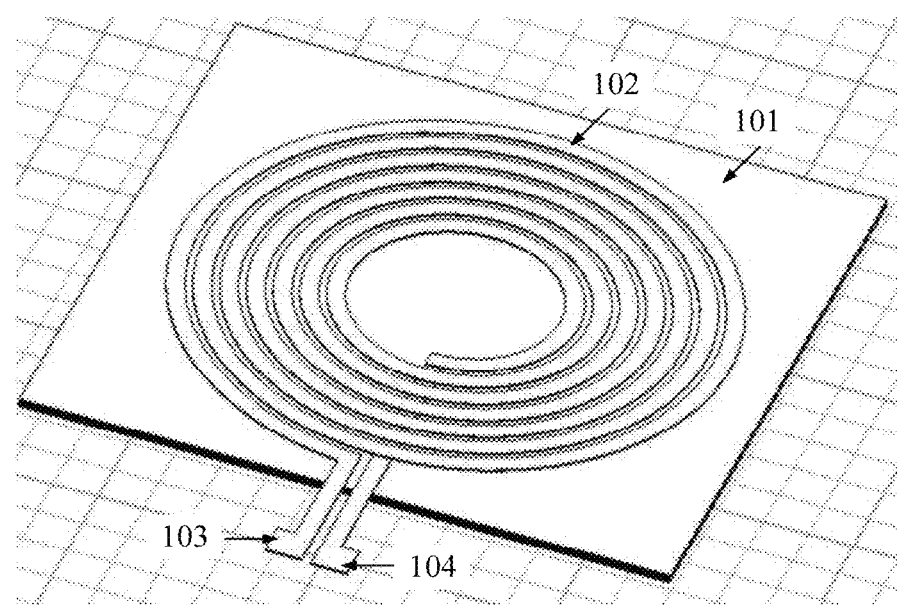
FIG. 1 is a schematic structural diagram of a wireless charging coil in other approaches.

FIG. 1 is a schematic structural diagram of a wireless charging coil in other approaches. The wireless charging coil includes a magnetic conductive sheet 101, a conductive coil 102, an input terminal 103, and an output terminal 104. The magnetic conductive sheet 101 is insulated from the conductive coil 102, and the magnetic conductive sheet 101 is made of a magnetic conductive material such as ferrite or amorphous nanocrystalline, to increase an inductance value of the conductive coil 102 and a coupling coefficient between a receiving coil and a transmitting coil, effectively prevent a magnetic field from leaking to an area below the magnetic conductive sheet 101, and reduce interference of the magnetic field to another component in the area below the magnetic conductive sheet. The conductive coil 102 is formed by spirally winding a metal conductor having conductive performance. In a winding direction of an inner coil or an outer coil, widths of conducting wires of the inner coil or the outer coil at locations are basically the same, and spacings between the conducting wires of the inner coil and the outer coil at the locations are basically the same. The conductive coil 102 is connected to an external circuit by using the input terminal 103 and the output terminal 104.

Figure 2:
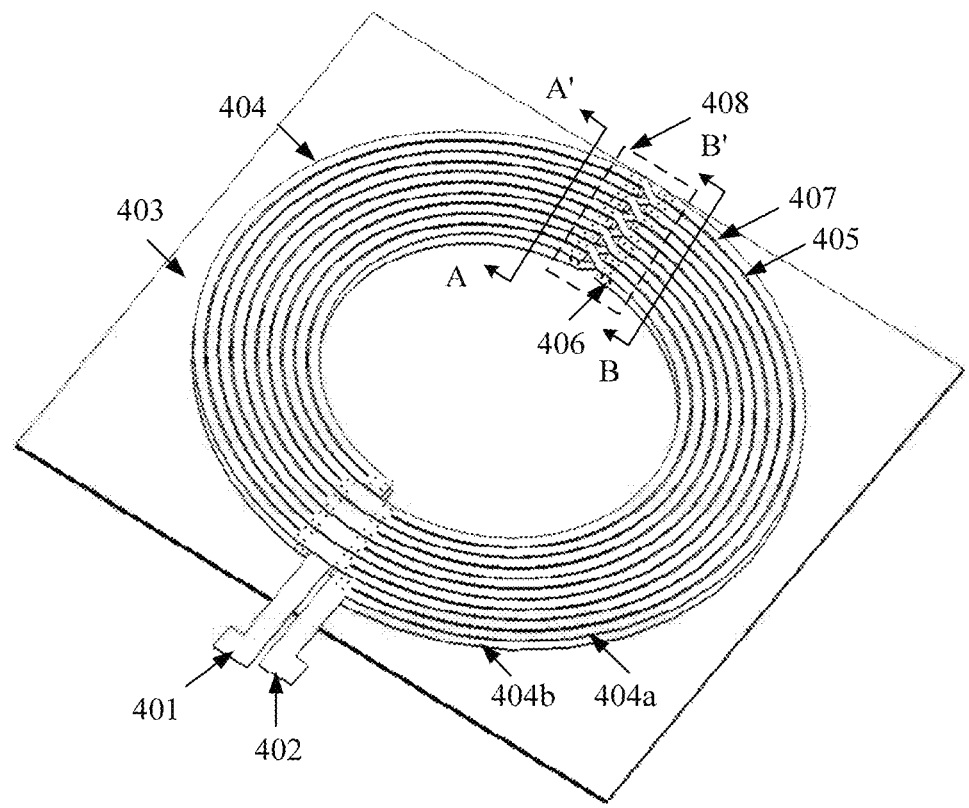
FIG. 2 is a schematic diagram of coil windings in a parallel cross-connection.

To reduce a loss of the wireless charging coil, currently, a parallel cross structure shown in FIG. 2 may be used.

A wireless charging coil includes a magnetic conductive sheet 403, coil windings 404, an input terminal 401, an output terminal 402, and a cutting groove 405.

The coil windings 404 include two planar coil windings, and the two planar coil windings are respectively a first planar coil winding 404a and a second planar coil winding 404b. Each of the first planar coil winding 404a and the second planar coil winding 404b includes a plurality of turns of coils. As shown in FIG. 2, there is one-to-one projection crossing (refer to an area 408 in FIG. 2) between a plurality of turns of coils included in the first planar coil winding 404a and a plurality of turns of coils included in the second planar coil winding 404b. The projection crossing means that a projection of a turn of conducting wire in the first planar coil winding 404a on a plane on which the magnetic conductive sheet 403 is located crosses a projection of a turn of conducting wire in the second planar coil winding 404b on the plane on which the magnetic conductive sheet 403 is located. As shown in FIG. 2, an area of a projection crossing is the area 408 shown in the figure.

When an external magnetic field passes through the cutting groove, some circulating current losses are generated on the coil windings due to electromagnetic induction. However, the coil windings cross each other at the area 408. In this case, induced currents generated by an alternating current magnetic field can be cancelled, a circulating current loss can be reduced, and wireless charging efficiency can be increased.

Figure 3:
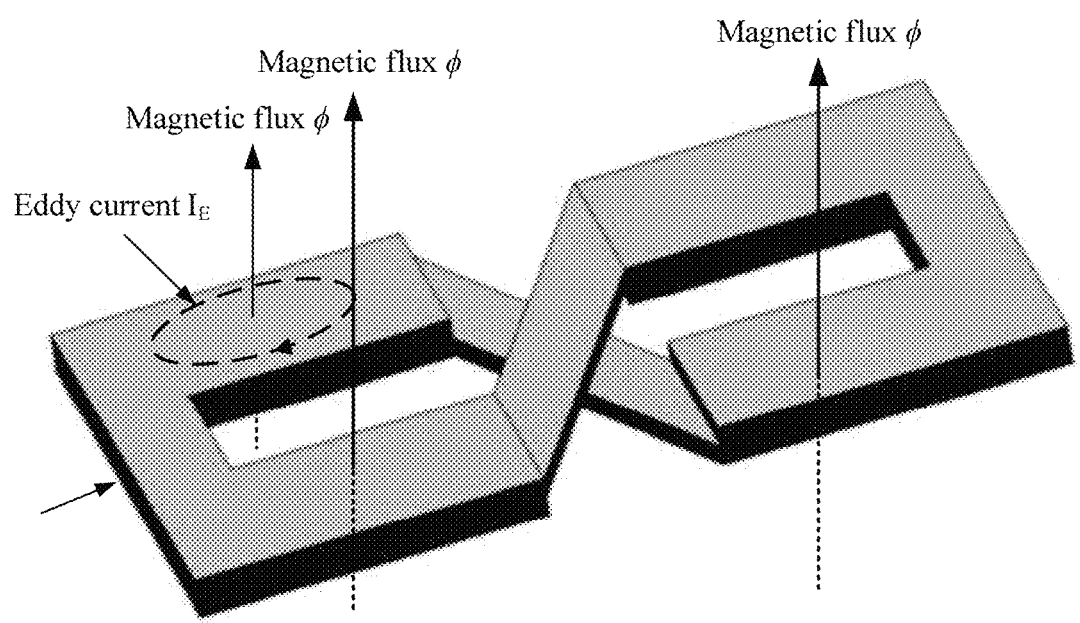
FIG. 3 is a schematic diagram of a principle of generating an eddy current of a coil winding.

The induced currents generated by the external magnetic field passing through the cutting groove can be mutually cancelled by using the foregoing winding cross structure, to reduce a circulating current loss generated inside a metal conductor. However, referring to a schematic diagram of a principle of generating an eddy current in a coil winding shown in FIG. 3, when an alternating magnetic field passes through two strands of coils obtained through division by a cutting groove, an eddy current IE is generated. As a result, an eddy current loss is generated in the coil winding, and further, wireless charging efficiency is reduced.

To further reduce eddy current losses generated in the coil windings, more cutting openings may be further cut to continue to perform cross-connection. However, in a current processing technology, when a cutting opening is being cut, a relatively large width of the cutting opening needs to be maintained, so that the cutting opening can be effectively cut through and two strands of coils obtained through cutting are completely separated and disconnected. When a width of the cutting opening is relatively small, in an existing process, it cannot ensure that two strands of coils obtained by cutting the cutting opening are completely disconnected. If the existing process is used, to ensure that the cutting opening can implement complete disconnection, the width of the cutting opening needs to be relatively large. Using an flexible printed circuit (FPC) process as an example, for a 65 micrometer (μm) coil thickness of a single-layer planar coil winding, a 100 μm spacing between wires needs to be ensured. Otherwise, it cannot be ensured that two adjacent strands are completely disconnected. However, when the width of the cutting opening is relatively large, a relatively large quantity of coil materials are correspondingly cut away, resulting in relatively low utilization of the coil.

Therefore, to resolve a technical problem of an eddy current loss in a coil, an embodiment of this application provides a coil module. The coil module includes a first planar coil winding, and the first planar coil winding includes a plurality of turns of coils. At least one turn of first coil in the plurality of turns of coils of the first planar coil winding includes at least one first cutting opening, and the first cutting opening divides the first coil into a first outer side part and a first inner side part along an extension direction of the coil. It should be noted that the first outer side part is isolated from the first inner side part due to the first cutting opening. Each of the first outer side part and the first inner side part has an independent connection end. To be specific, the first outer side part has a first connection end, and the first inner side part has a second connection end. A first target side part is at least one of the first outer side part and the first inner side part. To be specific, the first target side part includes a first cutting groove, and a width of a single first cutting groove is less than or equal to a width of a single first cutting opening. A direction of the first cutting groove is an extension direction of the first target side part. A thinner first cutting groove is obtained through cutting on the first planar coil winding, so that an eddy current path on the first planar coil winding can be cut off, and an eddy current is reduced, thereby reducing an eddy current loss of the first planar coil winding, and increasing wireless charging efficiency. Because two strands obtained through the cutting do not need to be completely separated and disconnected by the first cutting groove in this embodiment, the first cutting groove does not need to be as wide as the first cutting opening. Generally, the width of the first cutting groove may be less than the width of the first cutting opening. In other words, the first cutting groove is relatively thin.

To make the objectives, technical solutions, and advantages of this application clearer, the following further describes the implementations of this application in detail with reference to the accompanying drawings.

Embodiment 1 of this application provides a coil module to reduce an eddy current loss in a coil winding, and increase wireless charging efficiency. The following provides specific descriptions with reference to the accompanying drawings.

Figure 4A:
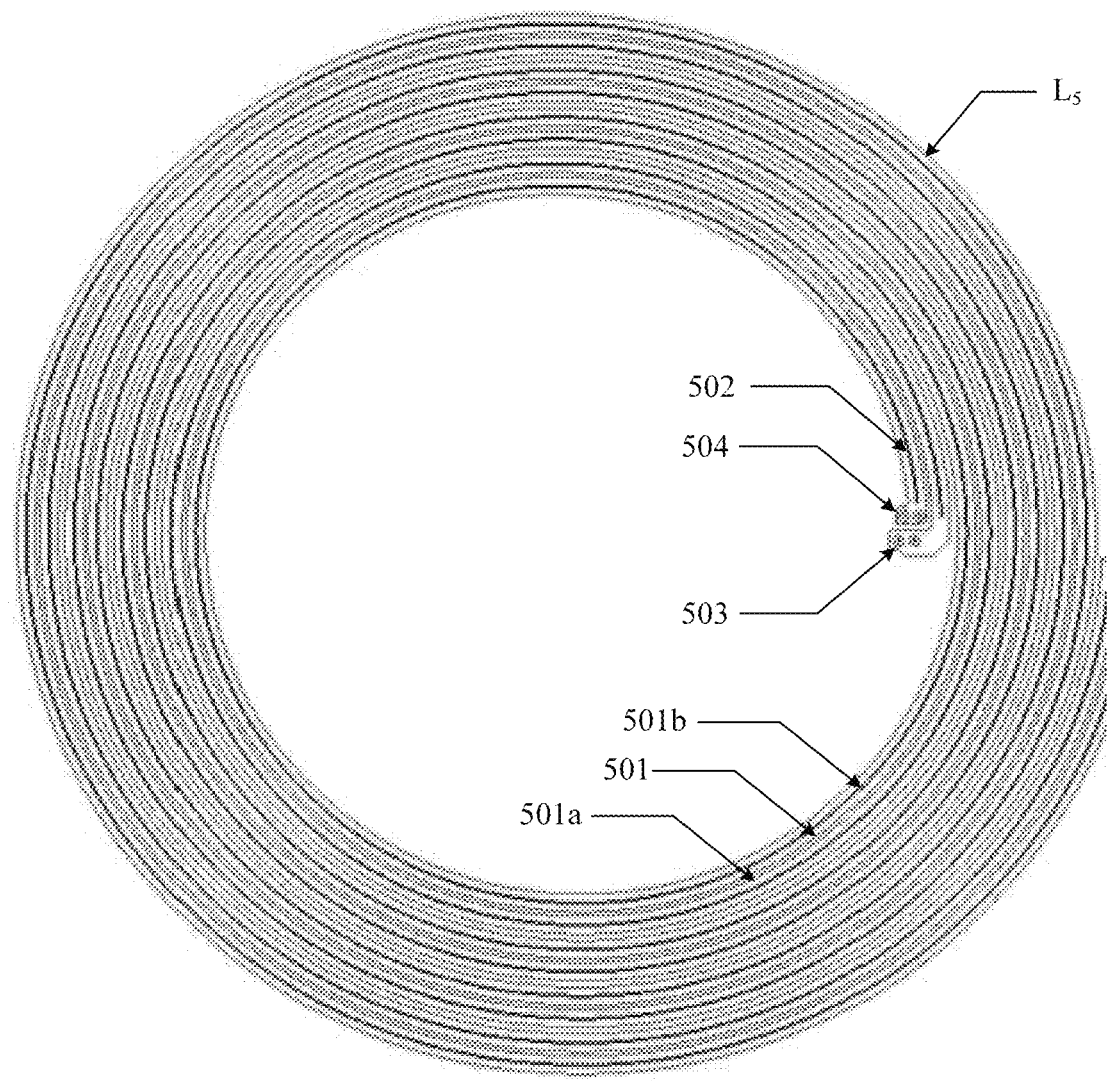
FIG. 4A is a schematic structural diagram of a first coil module according to Embodiment 1 of this application.

FIG. 4A is a schematic structural diagram of a first coil module according to Embodiment 1 of this application.

The coil module includes a first planar coil winding L5, and the first planar coil winding L5 includes a plurality of turns of coils.

At least one turn of first coil in the plurality of turns of coils includes at least one first cutting opening 501, and the first cutting opening 501 divides the coil into a first outer side part 501a and a first inner side part 501b along an extension direction of the coil. The first outer side part 501a has a first connection end 503, and the first inner side part has a second connection end 504.

That at least one turn of first coil in the plurality of turns of coils includes at least one first cutting opening 501 may be that one turn of coil includes at least one first cutting opening 501, or may be that a plurality of turns of coils include at least one first cutting opening 501.

The first cutting opening 501 provided in this embodiment of this application thoroughly divides a cut coil part into two independent parts the first outer side part 501a and the first inner side part 501b.

Each of the first outer side part 501a and the first inner side part 501b that are formed by cutting of the first cutting opening 501 has an independent connection end. To be specific, the first outer side part 501a has a first connection end 503, and the first inner side part 501b has a second connection end 504. An outer side is a side that is on a turn of coil and that is away from a center of the first planar coil winding L5, and an inner side is a side that is on the same turn of coil and that is close to the center of the first planar coil winding L5. Still using an example in which the first planar coil winding L5 is a circular ring, the center is a center of the circular ring. Wire widths of the first outer side part 501a and the first inner side part 501b that are obtained through division by the first cutting opening 501 are less than a wire width of the before-division first planar coil winding, and a smaller wire width of the coil winding indicates a smaller eddy current loss. Therefore, existence of the first cutting opening 501 can reduce an eddy current loss of the first planar coil winding, and increase wireless charging efficiency.

The first connection end and the second connection end may be connected to another circuit, for example, connected to an input end or an output end of a power supply, or may be connected to another coil winding, for example, connected to another planar coil winding to implement a series cross-connection, a parallel cross-connection, or a series-parallel hybrid cross-connection.

The first target side part includes a first cutting groove 502, and the first target side part is at least one of the first outer side part 501a and the first inner side part 501b. An extension direction of the first cutting groove 502 is the same as an extension direction of the first target side part, and a width of a single first cutting groove 502 is less than or equal to a width of a single first cutting opening 501.

The first outer side part 501a is the first target side part, or the first inner side part 501b is the first target side part, or each of the first outer side part 501a and the first inner side part 501b is the first target side part.

When each of the first outer side part 501*a* and the first inner side part 501*b* is the first target side part, it means that the first outer side part 501*a* includes a first cutting groove, and the first inner side part 501*b* also includes a first cutting groove. It should be known that an extension direction of the first cutting groove located in the first outer side part 501*a* is the same as an extension direction of the first outer side part 501*a*, and an extension direction of the first cutting groove located in the first inner side part 501*b* is the same as an extension direction of the first inner side part 501*b*.

A specific quantity of first cutting grooves 502 is not limited in this embodiment of this application. For example, the first outer side part 501*a* includes one first cutting groove 502, and the first inner side part 501*b* also includes one first cutting groove 502. In this case, the width of the single first cutting groove 502 is less than or equal to the width of the single first cutting opening 501. For another example, the first outer side part 501*a* includes two first cutting grooves 502, the first inner side part 501*b* also includes two first cutting grooves 502, and a total width of the two first cutting grooves 502 in the first outer side part 501*a* is less than or equal to the width of the single first cutting opening 501, and a total width of the two first cutting grooves 502 included in the first inner side part 501*b* is less than or equal to the width of the first single cutting opening 501.

The first cutting opening 501 needs to ensure that the first inner side part and the first outer side part are effectively disconnected, but the first cutting groove 502 does not need to ensure that the two divided parts are effectively disconnected. Therefore, a width of the first cutting groove 502 may be relatively small. The first cutting groove 502 is as thin as possible. In this way, waste of a winding material can be reduced, and utilization of the winding material can be increased. In addition, more first cutting grooves 502 can be obtained through cutting at a same width, thereby reducing an eddy current loss to a greater extent.

The first cutting groove 502 may be a through groove, or may be a blind groove, or may be partially a blind groove and partially a through groove. The through groove is a cutting groove whose cutting depth is the same as a thickness of a coil, that is, a cutting groove that completely cuts through the coil along a thickness direction of the coil. The blind groove is a cutting groove whose cutting depth is less than a thickness of a coil, that is, a cutting groove that does not cut through the coil. However, the first cutting groove 502 is not a penetrated through groove on the coil, and the first cutting groove 502 does not have a connection end. The first cutting groove 502 only partially divides an inner side part and/or an outer side part into two strands of coils, and does not divide the inner side part and/or the outer side part into two separate strands of coils as a whole.

The following describes a principle of reducing an eddy current loss of a coil module by using a first cutting groove 502 with reference to the accompanying drawings.

Figure 4B:
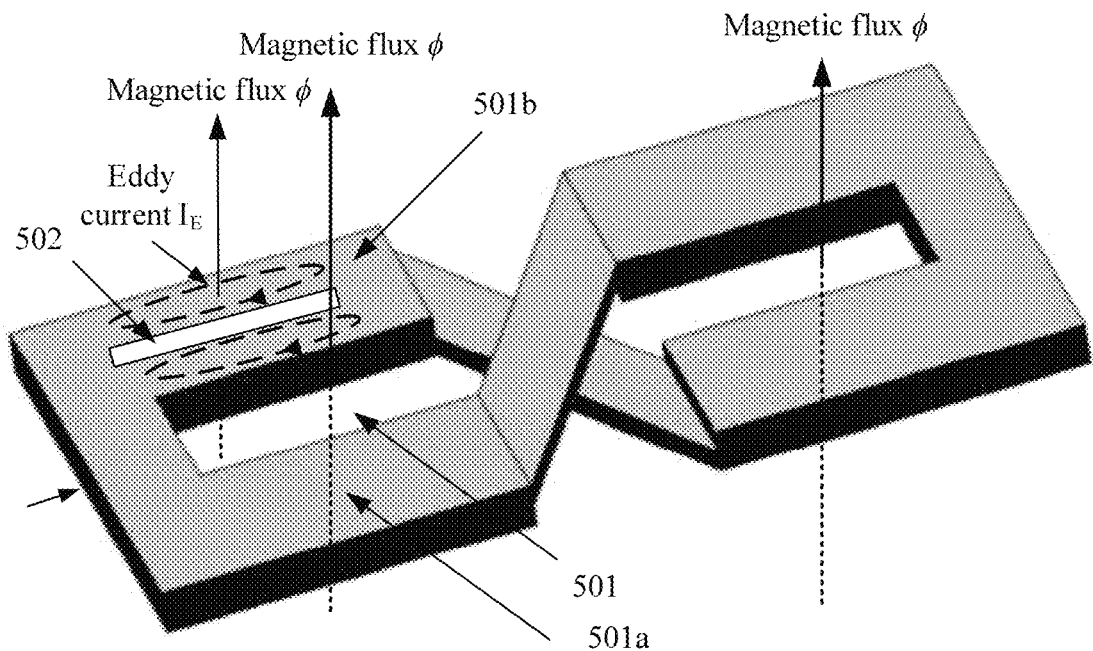
FIG. 4B is a schematic diagram of a principle of eddy-current blocking of a coil module according to Embodiment 1 of this application.

FIG. 4B is a schematic diagram of a principle of eddy-current blocking of a coil module according to coil module Embodiment 1 of this application.

A first cutting opening 501 divides a coil into a first outer side part 501*a* and a first inner side part 501*b* along an extension direction. An example in which the first outer side part 501*a* has one first cutting groove 502 is used. FIG. 4B may be compared with FIG. 3. An eddy current path on the first outer side part 501*a* is cut off by the first cutting groove 502.

Existence of the first cutting groove 502 reduces an effective area in which a magnetic field passes through a winding conductor, and a magnetic flux passing through the winding conductor is further reduced. Therefore, a generated eddy current IE is reduced, and wireless charging efficiency is increased.

Wire widths of the first outer side part and the first inner side part are less than a wire width of a first planar coil winding that is not divided. Therefore, an eddy current loss of the first planar coil winding can be reduced. In addition, a first connection end and a second connection end are used for cross-connection to another planar coil winding, and the cross-connection can reduce a circulating current loss and increase wireless charging efficiency. In addition, the first planar coil winding further includes a first cutting groove along an extension direction of a coil, and the first cutting groove is formed on a first outer side part and/or a first inner side part, to be specific, a width of a coil obtained through dividing the first cutting groove is less than a width of the first outer side part and/or a width of the first inner side part. Because the first cutting groove does not need to ensure that the two divided parts are effectively disconnected, a width of the first cutting groove may be as small as possible. When a direct current resistance is not increased as much as possible, an eddy current path of the first outer side part and/or the first inner side part is cut off when a magnetic field cuts the winding, so that an effective area in which a magnetic flux passes through the winding is reduced, the magnetic flux is reduced, and an eddy current loss in the first planar coil winding is further reduced. Therefore, the first planar coil winding in this embodiment of this application can not only reduce the eddy current loss, but also reduce a circulating current loss, thereby increasing overall charging efficiency during wireless charging.

The first planar coil winding may be obtained through processing by using a printed circuit board (PCB) process, an FPC process, an etching method, an electroplating addition method, a die cutting process, or the like. In addition, a specific processing method for processing the first cutting opening on the first planar coil winding may be the same as the foregoing method for processing the first cutting opening, and a process such as a laser cutting process or a plasma cutting process may be alternatively used.

Because two divided strands of coils do not need to be completely separated and disconnected by using the first cutting groove in this embodiment, the first cutting groove does not need to be as wide as the first cutting opening. Generally, the width of the first cutting groove may be less than a width of the first cutting opening. In other words, the first cutting groove is relatively thin. A specific processing method for processing the first cutting groove on the first planar coil winding may be a process such as a laser cutting process or a plasma cutting process.

The first cutting groove penetrates the first target side part along an extension direction of the first target side part, or a plurality of first cutting grooves are distributed along an extension direction of a first target side part, and two adjacent first cutting grooves are separated from each other.

When at least one of the first outer side part and the first inner side part includes one first cutting groove, in this embodiment of this application, the first cutting groove may be a continuous groove or a segment groove along the extension direction of the first target side part. Both the continuous groove and the segment groove are concepts for a side part, and the side part may be the first outer side part or the first inner side part. For example, for the first outer side part, a first cutting groove distributed along an extension direction of the first outer side is referred to as the one first cutting groove. If the first cutting groove penetrates the first outer side part along the extension direction of the first outer side part, the first cutting groove is a continuous groove. If the first cutting groove includes a plurality of cutting grooves along the extension direction of the first outer side part, the one first cutting groove is a segment groove. It should be noted that, when the first cutting groove is the continuous groove, the through groove is not so much the first cutting groove as a gap if the continuous groove is still a through groove. The gap divides the first outer side part into two mutually independent parts along a width direction of the first outer side part. However, in this application, for unified description, even if the first cutting groove is a continuous groove and through groove, the first cutting groove is still referred to as the first cutting groove instead of the gap.

It should be noted that when the first cutting groove is the segment groove, a length direction of each cutting groove located in the segment groove is the same as the extension direction of the first outer side part corresponding to each cutting groove.

In addition, when the first outer side part includes at least two first cutting grooves, when the first inner side part includes at least two first cutting grooves, or when each of the first outer side part and the first inner side part includes at least two first cutting grooves, all the first cutting grooves may be continuous grooves or segment grooves, or may include a combination of a continuous groove and a segment groove.

For example, when the first outer side part includes two first cutting grooves, the first cutting grooves may be specifically two continuous grooves or two segment grooves, or may be a continuous groove and a segment groove.

When the first outer side part includes more than two first cutting grooves, a specific quantity of continuous grooves and segment grooves is not specifically limited in this application, but a total width of all first cutting grooves needs to be less than a width of a single first cutting opening. A width of the first cutting groove is relatively fine. In this way, more first cutting grooves can be cut on the first outer side part. In addition, waste of a winding material can be reduced, utilization of the winding material can be increased. Alternatively, the total width of all first cutting grooves may be equal to the width of the single first cutting opening.

In addition, when the first cutting grooves include at least one continuous groove and at least one segment groove, the continuous groove and the segment groove may be arranged in a staggering manner, or may be arranged in another manner. This is not specifically limited in this application.

Furthermore, when a plurality of first cutting grooves are distributed along the extension direction of the first target side part, the plurality of first cutting grooves may be evenly or unevenly distributed along the extension direction of the coil. Even distribution means that lengths of all first cutting grooves are the same, and distances between the first cutting grooves in the extension direction of coil are the same. The lengths of all first cutting grooves and the distances between the first cutting grooves are not specifically limited in this application. Other cases are unevenly distribution, and details are not described herein.

The following specifically describes specific implementation of a first planar coil winding in Embodiment 2 according to this application with reference to the accompanying drawings.

Figure 5A:
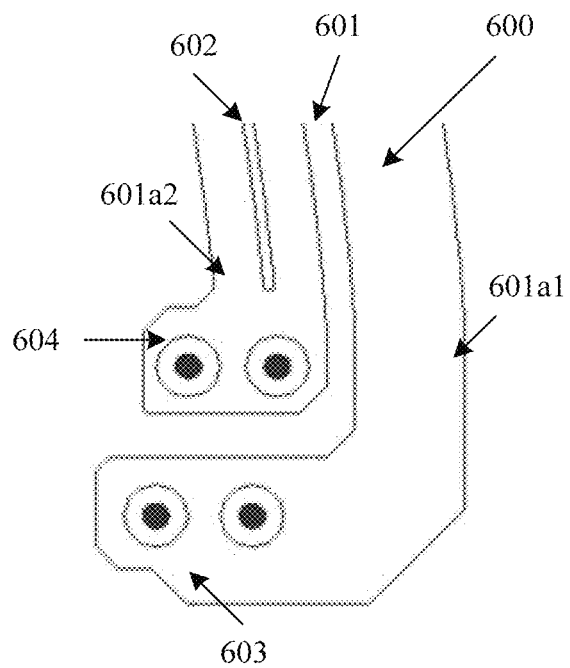
FIG. 5A is a schematic diagram in which a first inner side part of a first planar coil winding includes one first cutting groove according to Embodiment 2 of this application.

FIG. 5A is a schematic diagram in which a first inner side part of a first planar coil winding includes one first cutting groove according to Embodiment 2 of this application.

In FIG. 5A, only one of two side parts that are on the first planar coil winding and that are obtained through division by a first cutting opening includes a first cutting groove. The following uses an example in which the first inner side part includes one first cutting groove.

FIG. 5A is a schematic diagram of a part of an area of the first planar coil winding. A coil module provided in this embodiment includes a first planar coil winding 600.

A first cutting opening 601 on the first planar coil winding 600 divides a coil into a first outer side part 601a1 and a first inner side part 601a2, where the first outer side part 601a1 has a first connection end 603, and the first inner side part 601a2 has a second connection end 604.

It can be learned from the figure that only the first inner side part 601a2 has one first cutting groove 602.

In addition, the first inner side part may further include a plurality of first cutting grooves. The following uses an example in which the first inner side part includes two first cutting grooves for description. For details, refer to FIG. 5B.

Figure 5B:
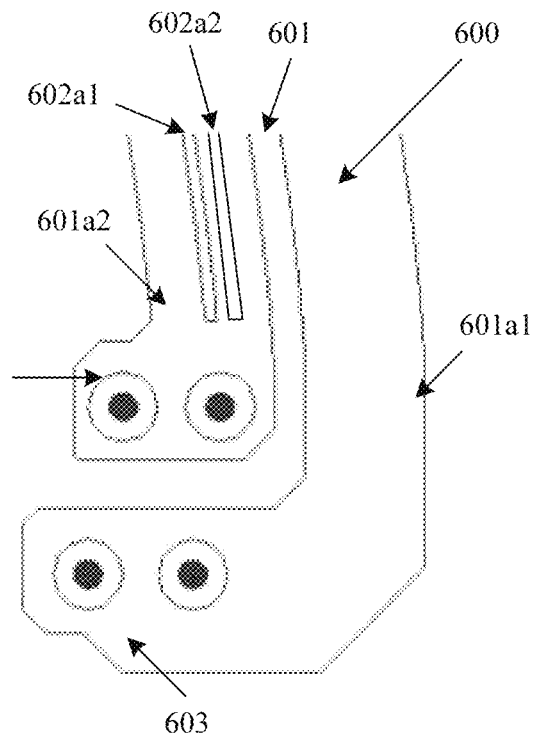
FIG. 5B is a schematic diagram in which a first inner side part of a first planar coil winding includes two first cutting grooves according to Embodiment 2 of this application.

FIG. 5B is a schematic diagram in which a first inner side part includes two first cutting grooves according to Embodiment 2 of this application.

A difference of a structure shown in FIG. 5B from a structure shown in FIG. 5A lies in that the first inner side part 601a2 has two first cutting grooves that are respectively 602a1 and 602a2.

It may be understood that the first cutting grooves included in the first inner side part 601a2 may continue to be extended to a larger quantity, for example, three, four, or even more. However, it should be noted that when the first inner side part 601a2 includes at least two first cutting grooves, a sum of widths of all first cutting grooves on the first inner side part 601a2 is less than or equal to a width of a single first cutting opening.

It may be understood that a structure of one or more first cutting grooves 602 on the first outer side part 601a1 is similar to a structure of only one or more first cutting grooves on the first inner side part 601a2, and details are not described herein. However, it should be noted that when the first outer side part 601a1 includes at least two first cutting grooves, a sum of widths of all first cutting grooves on the first outer side part 601a1 is less than or equal to a width of a single first cutting opening.

The foregoing is an implementation in which only one side part includes one or more first cutting grooves. The following respectively describes implementations in which each of two side parts includes one or more first cutting grooves with reference to the accompanying drawings.

Figure 5C:
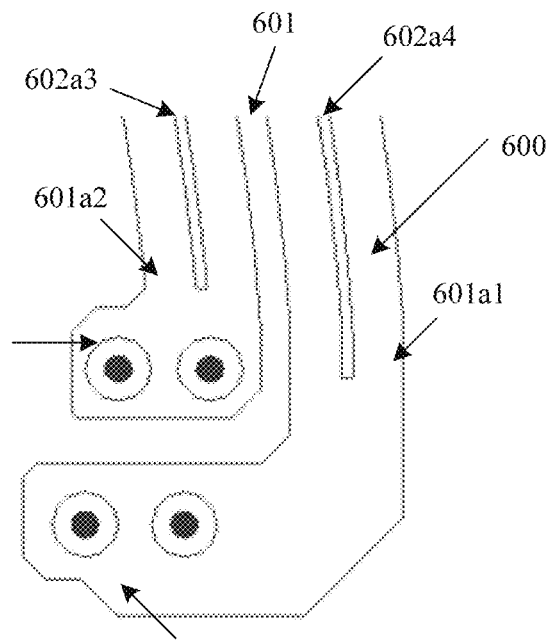
FIG. 5C is a schematic diagram in which each of a first inner side part and a first outer side part includes one first cutting groove according to Embodiment 2 of this application.

FIG. 5C is a schematic diagram in which each of a first inner side part and a first outer side part includes one first cutting groove according to Embodiment 2 of this application.

It can be seen from the figure that the first inner side part 601a2 has one first cutting groove 602a3, and the first outer side part 601a1 also has one first cutting groove 602a4.

In addition, each of the first inner side part and the first outer side part may further include a plurality of first cutting grooves. However, it should be noted that when each side part includes at least two first cutting grooves, a sum of widths of all first cutting grooves on each side part is less than or equal to a width of a single first cutting opening.

The following uses an example in which each of the first inner side part and the first outer side part includes two first cutting grooves for description. For details, refer to FIG. 5D.

Figure 5D:
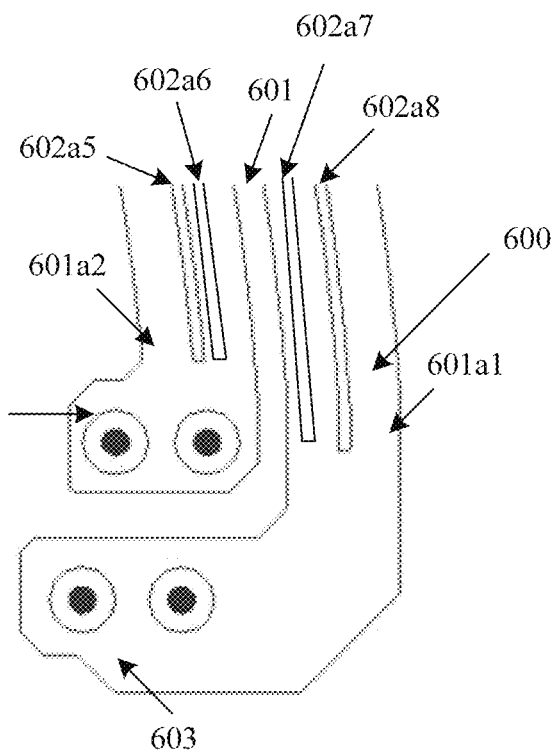
FIG. 5D is a schematic diagram in which each of a first inner side part and a first outer side part includes two first cutting grooves according to Embodiment 2 of this application.

FIG. 5D is a schematic diagram in which each of a first inner side part and a first outer side part includes two first cutting grooves according to Embodiment 2 of this application.

It can be learned from the figure that the first inner side part 601a2 has two first cutting grooves that are respectively 602a5 and 602a6, and the first outer side part 601a1 has two first cutting grooves that are respectively 602a7 and 602a8.

The foregoing uses an example in which the two side parts include a same quantity of first cutting grooves when each of the two side parts includes one first cutting groove for description. It may be understood that quantities of first cutting grooves in the two side parts may alternatively be different. This is not specifically limited in this embodiment of this application.

The foregoing uses only an example in which the coil module includes one planar coil winding for description. The coil module in this embodiment of this application may further include a second planar coil winding. At least one turn of second coil in a plurality of turns of coils of the second planar coil winding includes at least one second cutting opening, and the second cutting opening divides the second coil into a second outer side part and a second inner side part along an extension direction of the coil. The second outer side part has a third connection end, and the second inner side part has a fourth connection end. The first connection end is connected to the fourth connection end, and the second connection end is connected to the third connection end, to implement a serial cross-connection or a parallel cross-connection between the first planar coil winding and the second planar coil winding. The first planar coil winding and the second planar coil winding may weaken a circulating current loss generated in a coil by performing the series cross-connection or the parallel cross-connection. The following describes a working principle of the series cross-connection or the parallel cross-connection between the first planar coil winding and the second planar coil winding with reference to a specific embodiment.

A coil module provided in Embodiment 3 of this application includes a first planar coil winding and a second planar coil winding, and the first planar coil winding and the second planar coil winding are in series cross-connection.

The first planar coil winding provided in this embodiment includes a first cutting opening and a first cutting groove, and the second planar coil winding includes only a second cutting opening.

For various implementations of the first planar coil winding, refer to any one of the implementations of coil module Embodiment 2. Details are not described herein.

For ease of understanding, the following uses an example in which each of a first inner side part and a first outer side part of the first planar coil winding includes one first cutting groove for description.

Figure 6A:
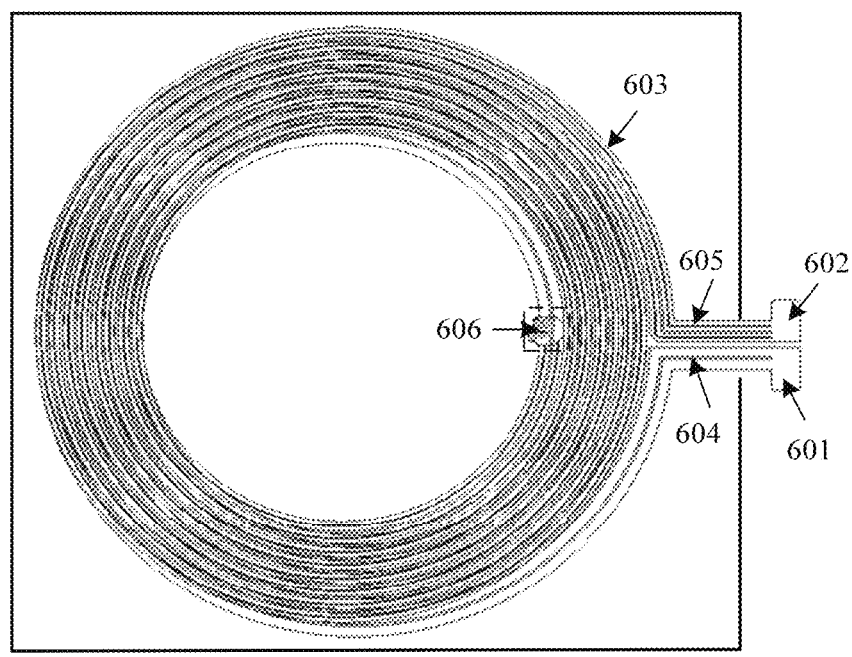
FIG. 6A is a structural diagram of another coil module according to Embodiment 3 of this application.

FIG. 6A is a schematic structural diagram of another coil module according to Embodiment 3 of this application.

The coil module provided in this embodiment includes an output terminal 601, an input terminal 602, planar coil windings 603, cutting openings 604, cutting grooves 605, and connection ends 606.

Figure 6B:
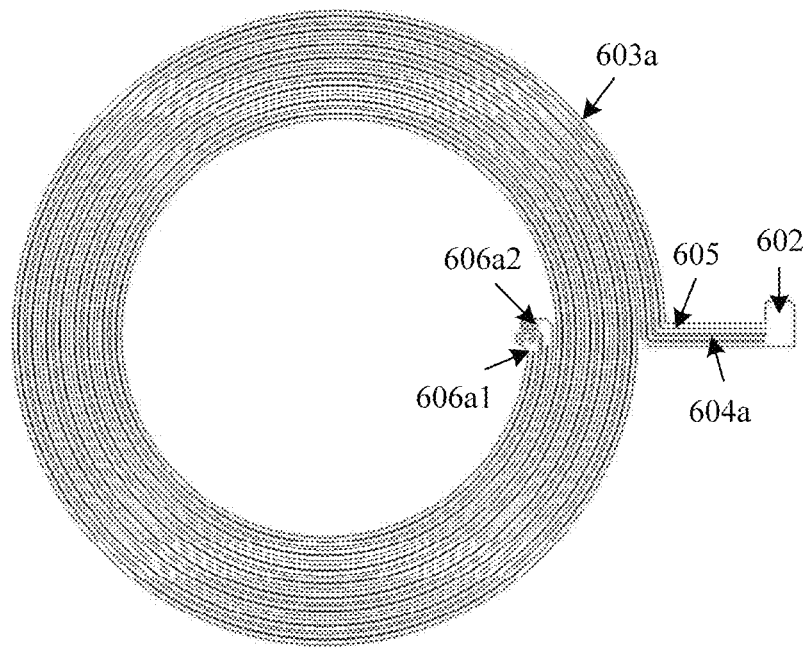
FIG. 6B is a structural diagram of a first planar coil winding corresponding to FIG. 6A.
Figure 6C:
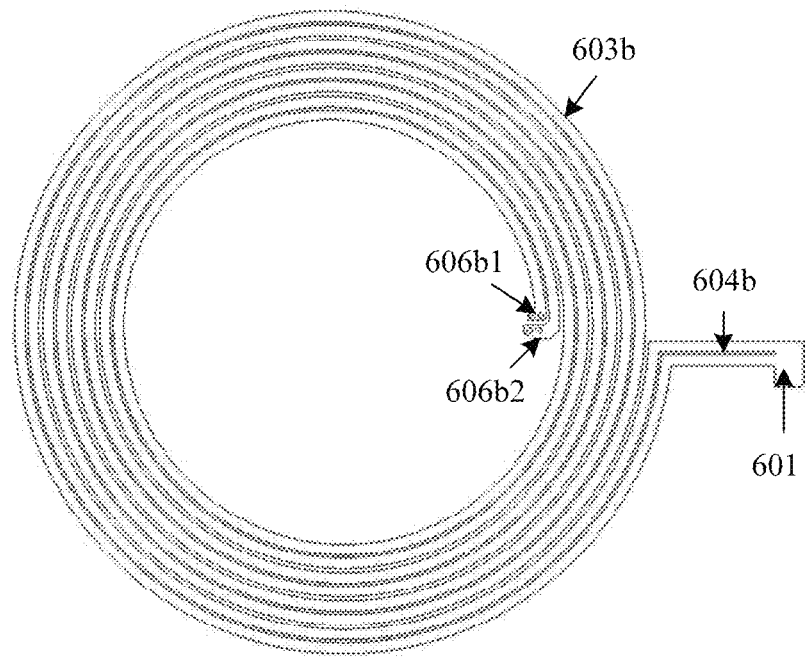
FIG. 6C is a structural diagram of a second planar coil winding corresponding to FIG. 6A.

The planar coil windings 603 include the following two planar coil windings. Respectively refer to a first planar coil winding 603a and a second planar coil winding 603b that are shown in FIG. 6B and FIG. 6C.

The following first describes the first planar coil winding 603a.

The first planar coil winding 603a includes the input terminal 602, a first cutting opening 604a, a first cutting groove 605a1, a first cutting groove 605a2, a first connection end 606a2, and a second connection end 606a1. The first cutting opening 604a divides the first planar coil winding 603a into a first outer side part and a first inner side part along an extension direction of a coil, and each of the first outer side part and the first inner side part has one first cutting groove.

The following describes the second planar coil winding 603b.

The second planar coil winding 603b includes the output terminal 601, a second cutting opening 604b, a third connection end 606b2, and a fourth connection end 606b1. The second cutting opening 604b divides the second planar coil winding 603b into a second outer side part and a second inner side part along the extension direction of the coil, and the second planar coil winding 603b does not have a cutting groove.

The following describes the series cross-connection between the first planar coil winding 603a and the second planar coil winding 603b.

The first connection end 606a2 of the first planar coil winding 603a is connected to the fourth connection end 606b1 of the second planar coil winding 603b, and the second connection end 606a1 of the first planar coil winding 603a is connected to the third connection end 606b2 of the second planar coil winding 603b. To be specific, a connection end of the first outer side part of the first planar coil winding 603a is correspondingly connected to a connection end of the second inner side part of the second planar coil winding 603b, and a connection end of the first inner side part of the first planar coil winding 603a is correspondingly connected to a connection end of the second outer side part of the second planar coil winding 603b, to implement the series cross-connection.

According to the coil module provided in this embodiment, the first planar coil winding and the second planar coil winding are divided into side parts with smaller wire widths by using cutting openings. In this way, eddy current losses of the first planar coil winding and the second planar coil winding are reduced. In addition, the series cross-connection is performed on the two planar coil windings, so that a circulating current loss can be reduced, and wireless charging efficiency can be increased. In addition, the first planar coil winding further includes a first cutting groove along the extension direction of the coil, and the first cutting groove is formed on the first outer side part and/or the first inner side part. To be specific, a width of a coil obtained through dividing the first cutting groove is less than a width of the first outer side part and/or a width of the first inner side part. Because the first cutting groove does not need to ensure that the two divided parts are effectively disconnected, a width of the first cutting groove may be as small as possible. When a direct current resistance is not increased as much as possible, an eddy current path of the first outer side part and/or the first inner side part is cut off when a magnetic field cuts the winding, so that an effective area in which a magnetic flux passes through the winding is reduced. In this way, a magnetic flux is reduced, and an eddy current loss in the first planar coil winding is further reduced. Therefore, the coil module in this embodiment of this application can not only reduce the eddy current loss, but also reduce a circulating current loss, thereby increasing overall charging efficiency during wireless charging.

In Embodiment 3 of this application, when the two planar coil windings perform the series cross-connection, the second planar coil winding of the two planar coil windings includes only the second cutting opening, and does not include a second cutting groove. The following describes Embodiment 4 of this application. In this embodiment, when a coil module includes two planar coil windings, each of a first planar coil winding and a second planar coil winding includes one cutting opening and one cutting groove.

A second target side part of the second planar coil winding includes a second cutting groove, and the second target side part is at least one of the second outer side part and the second inner side part. An extension direction of the second cutting groove is the same as an extension direction of the second target side part of the second planar coil winding, and a width of a single second cutting groove is less than or equal to a width of a single second cutting opening on the second planar coil winding.

An implementation in which the second planar coil winding includes one cutting groove is similar to the implementation in which the first planar coil winding includes one cutting groove. The following describes various implementations of the second planar coil winding with reference to the accompanying drawings.

Figure 7A:
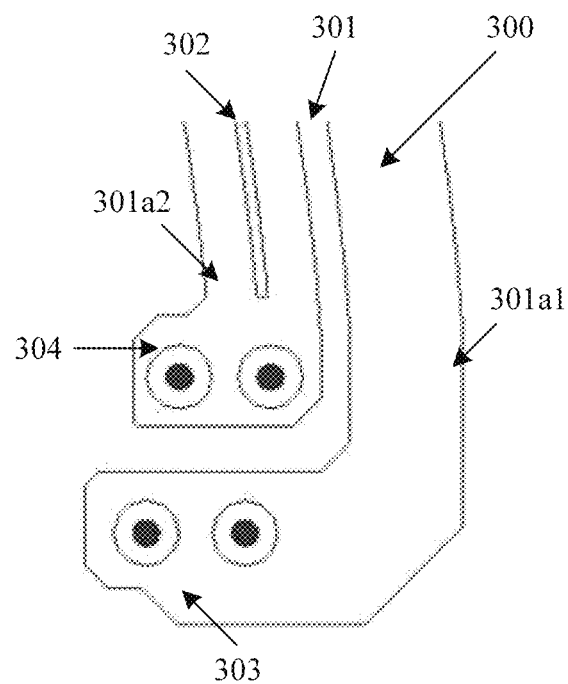
FIG. 7A is a schematic diagram in which a second inner side part of a second planar coil winding includes one second cutting groove according to Embodiment 4 of this application.

FIG. 7A is a schematic structural diagram of a second planar coil winding according to Embodiment 4 of this application.

FIG. 7A is a schematic structural diagram of a part of an area of the second planar coil winding. The coil module provided in this embodiment includes a second planar coil winding 300, a second cutting opening 301, a second cutting groove 302, a third connection end 303, and a fourth connection end 304.

The second cutting opening 301 divides the second planar coil winding 300 into a second outer side part 301a1 and a second inner side part 301a2, and the second outer side part 301a1 has the third connection end 303, and the second inner side part 301a2 has the fourth connection end 304.

Only the second inner side part 301a2 has one second cutting groove 302.

Figure 7B:
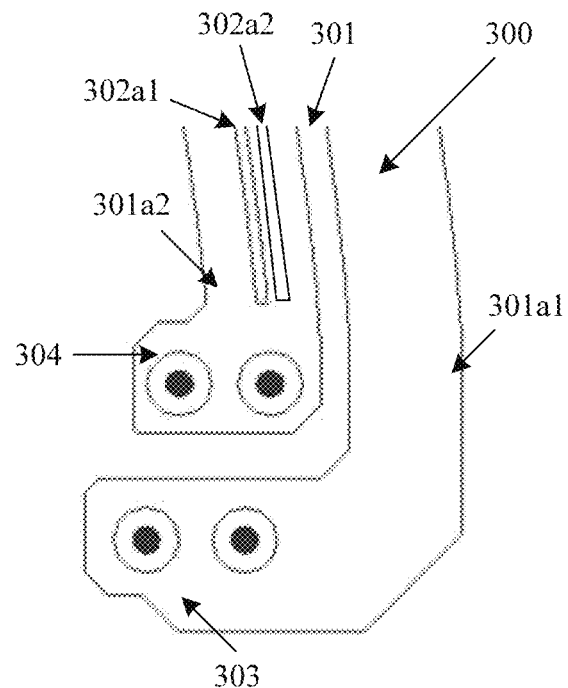
FIG. 7B is a schematic diagram in which a second inner side part of a second planar coil winding includes two second cutting grooves according to Embodiment 4 of this application.

FIG. 7B is a schematic structural diagram of still another second planar coil winding according to Embodiment 4 of this application.

A difference of a structure shown in FIG. 7B from a structure shown in FIG. 7A lies in that a second inner side part 301a2 has two second cutting grooves that are respectively 302a1 and 302a2.

In addition, the second cutting grooves that the second inner side part 301a2 has may continue to be extended to a larger quantity. However, it should be noted that when the second inner side part 301a2 includes at least two second cutting grooves, a sum of widths of all second cutting grooves on the second inner side part 301a2 is less than or equal to a width of a single second cutting opening.

It may be understood that a structure in which the second outer side part 301a1 has one or more second cutting grooves 302 is similar to a structure in which only the second inner side part 301a2 has one or more second cutting grooves 302, and details are not described herein. However, it should be noted that when the second outer side part 301a1 includes at least two second cutting grooves, a sum of widths of all second cutting grooves on the second outer side part 301a1 is less than or equal to a width of a single second cutting opening.

Figure 7C:
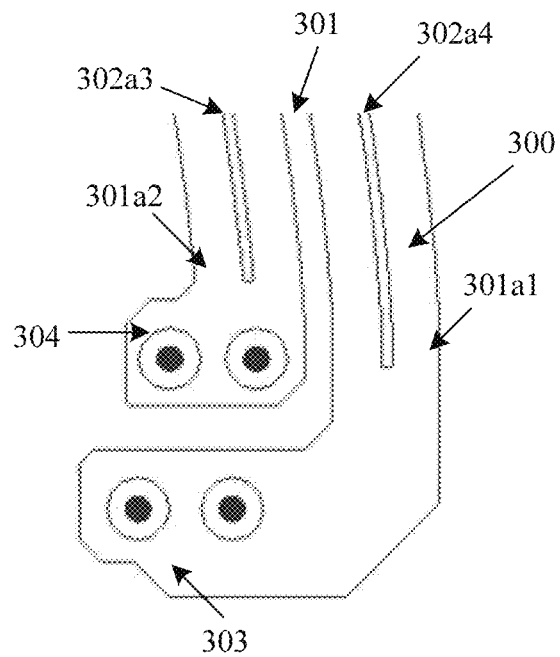
FIG. 7C is a schematic diagram in which each of a second inner side part and a second outer side part of a second planar coil winding includes one second cutting groove according to Embodiment 4 of this application.

FIG. 7C is a schematic structural diagram of yet another second planar coil winding according to Embodiment 4 of this application.

A difference of a structure shown in FIG. 7C from the structure shown in FIG. 7A lies in that a second inner side part 301a2 has one second cutting groove 302a3, and a second outer side part 301a1 has one second cutting groove 302a4.

Figure 7D:
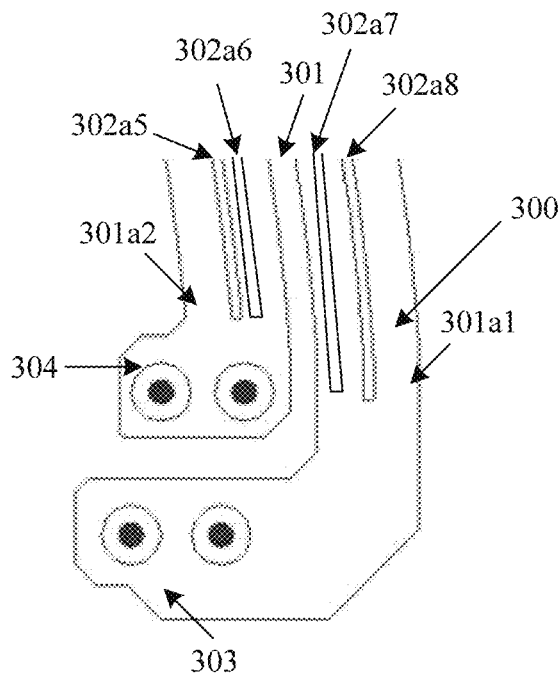
FIG. 7D is a schematic diagram in which each of a second inner side part and a second outer side part of a second planar coil winding includes two second cutting grooves according to Embodiment 4 of this application.

FIG. 7D is a schematic structural diagram of another second planar coil winding according to Embodiment 4 of this application.

A difference of a structure shown in FIG. 7D from the structure shown in FIG. 7B lies in that a second inner side part 301a2 has two second cutting grooves that are respectively 302a5 and 302a6, and a second outer side part 301a1 has two second cutting grooves that are respectively 302a7 and 302a8.

It may be understood that the second cutting grooves 302 on the second outer side part 301a1 and the second inner side part 301a2 may continue to be extended to a larger quantity. However, it should be noted that when each side part includes at least two second cutting grooves, a sum of widths of all second cutting grooves on each side part is less than or equal to a width of a single second cutting opening.

The foregoing uses an example in which the two side parts include a same quantity of second cutting grooves when each of the two side parts includes one second cutting groove for description. It may be understood that quantities of second cutting grooves in the two side parts may alternatively be different. This is not specifically limited in this embodiment of this application.

When the foregoing coil module embodiment includes two planar coil windings that are in series cross-connection, structures of the two planar coil windings may be different. In Embodiment 5 of this application, the following describes an implementation of the series cross-connection by using an example in which the structures of the two planar coil windings are the same. Specifically, an example in which each of an outer side part and an inner side part of each planar coil winding includes one cutting groove and the cutting groove is a continuous groove and through groove is used for description.

Figure 8A:
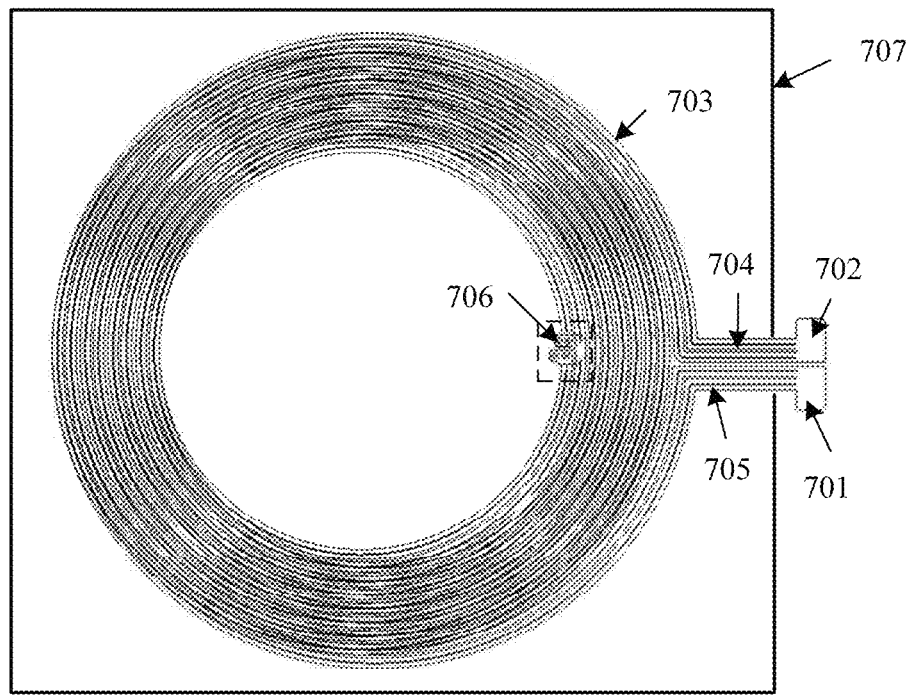
FIG. 8A is a schematic structural diagram of another coil module according to Embodiment 5 of this application.

FIG. 8A is a schematic structural diagram of another coil module according to Embodiment 5 of this application.

The coil module provided in this embodiment includes an input terminal 701, an output terminal 702, planar coil windings 703, cutting openings 704, cutting grooves 705, connection ends 706, and a magnetic conductive sheet 707.

Figure 8B:
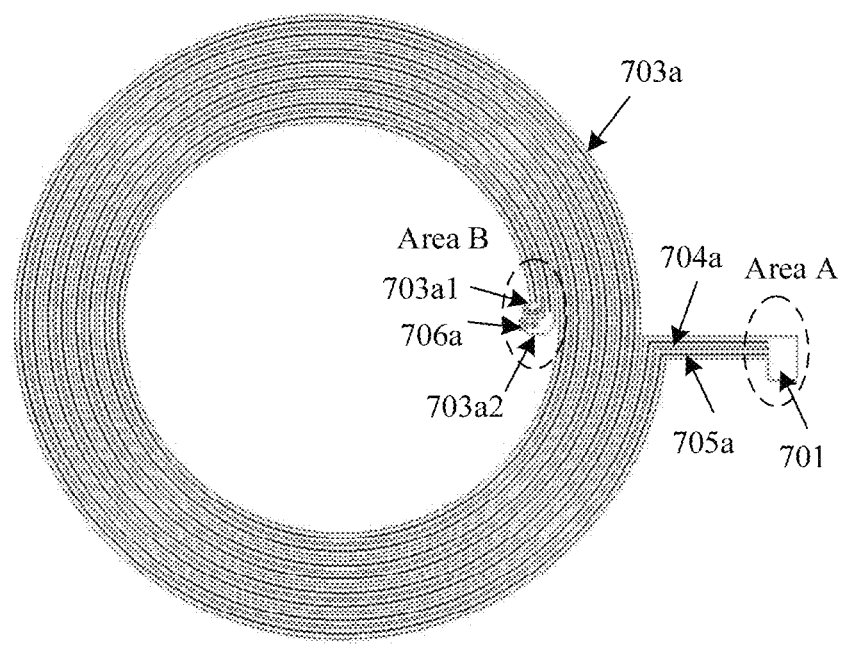
FIG. 8B is a schematic structural diagram of a first planar coil winding of another coil module according to Embodiment 5 of this application.
Figure 8C:
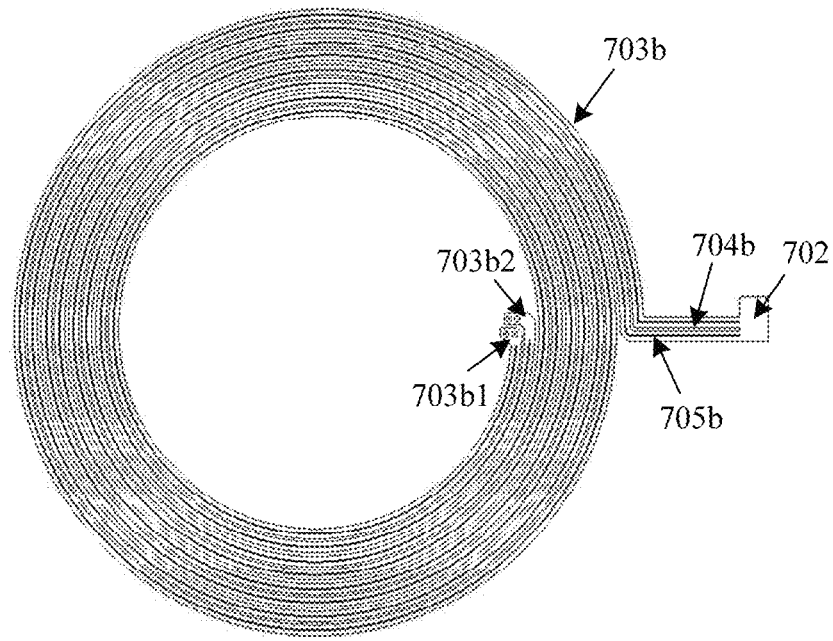
FIG. 8C is a schematic structural diagram of a second planar coil winding of another coil module according to Embodiment 5 of this application.

The coil module provided in this embodiment includes the following two planar coil windings. Respectively refer to a first planar coil winding 703a and a second planar coil winding 703b that are shown in FIG. 8B and FIG. 8C.

The following first describes the first planar coil winding 703a.

A first cutting opening 704a on the first planar coil winding 703a divides each turn of coil into a first inner side part 703a1 and a first outer side part 703a2 along an extension direction of the coil. Each of the first inner side part 703a1 and the first outer side part 703a2 includes one first cutting groove 705a along the extension direction of the coil. A width of a single first cutting groove 705a is less than or equal to a width of a single first cutting opening 704a.

The following describes the second planar coil winding 703b.

Similarly, a second cutting opening 704b on the second planar coil winding 703b divides each turn of coil into a second inner side part 703b1 and a second outer side part 703b2 along an extension direction of the coil. Each of the second inner side part 703b1 and the second outer side part 703b2 includes one second cutting groove 705b along the extension direction of the coil. A width of a single second cutting groove 705b is less than or equal to a width of a single second cutting opening 704b.

The magnetic conductive sheet 707 has a magnetic conductive function, can increase an inductance value of the planar coil winding, and prevent a magnetic field from leaking to a side without the planar coil winding. The magnetic conductive sheet 707 may be made of one or more magnetic materials such as ferrite, noncrystalline, nanocrystalline, and metal powder core.

Figure 9:
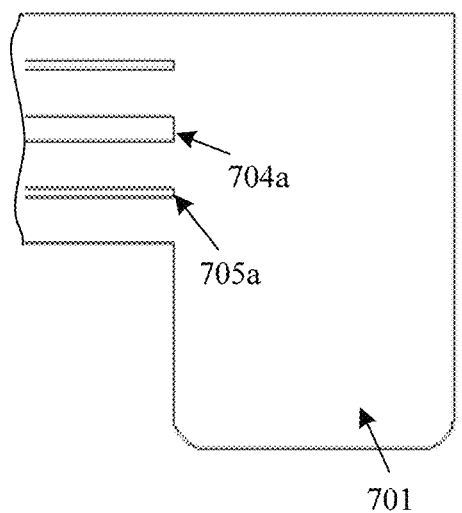
FIG. 9 is an enlarged diagram corresponding to an area A in FIG. 8B according to Embodiment 5 of this application.

It should be noted that, for details, reference may be made to FIG. 9. FIG. 9 is an enlarged diagram of an area A in FIG. 8B. Neither the first cutting groove 705*a* nor the first cutting opening 704*a* is cut at the input terminal 701, so that the first cutting groove 705*a* and the first cutting opening 704*a* are connected to an external power supply or an external load by using the input terminal 701. It may be understood that the cutting groove and the cutting opening may alternatively pass through the input terminal or the output terminal, to be connected to a power supply or a load outside the input terminal or the output terminal. A structure of a corresponding part of the second planar coil winding 703*b* is similar to that of the first planar coil winding 703*a*, and details are not described herein.

Structures of the input terminal 701 and the output terminal 702 may be the same or may be different. In this embodiment of this application, an example in which the first planar coil winding 703*a* has the input terminal 701 and the second planar coil winding 703*b* has the output terminal 702 is used. In another possible implementation, the first planar coil winding 703*a* may have the output terminal 702, and correspondingly the second planar coil winding 703*b* may have the input terminal 701.

The two connection ends may be connected through via, or may be electrically connected by using a pulse heating reflow soldering (hot bar) process or a laser soldering process. As shown in the figure, the first outer side part 703*a*2 of the first planar coil winding is connected to the second inner side part 703*b*1 of the second planar coil winding, and the first inner side part 703*a*1 of the first planar coil winding is connected to the second outer side part 703*b*2 of the second planar coil winding, so that the first planar coil winding and the second planar coil winding cross at a connection end (there is no electrical connection at intersection).

Figure 10:
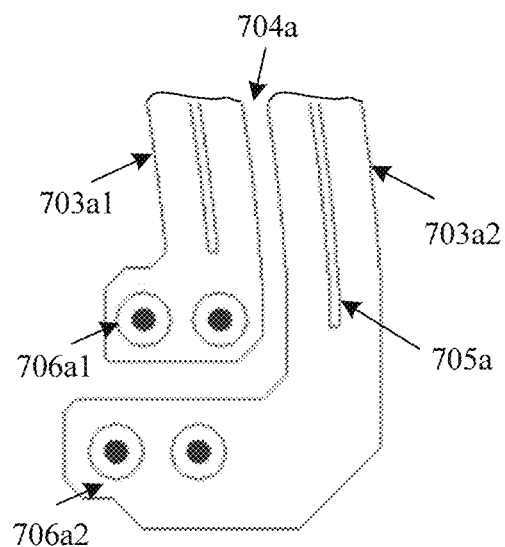
FIG. 10 is an enlarged diagram corresponding to an area B in FIG. 8B according to Embodiment 5 of this application.

In addition, a cutting groove is not cut at a connection end. For details, refer to FIG. 10. FIG. 10 is an enlarged diagram of an area B in FIG. 8B. It should be noted that the first outer side part 703*a*2 of the first planar coil module 703*a* has a first connection end 706*a*2, the first inner side part 703*a*1 has a second connection end 706*a*1, and vias are disposed in both the first connection end 706*a*2 and the second connection end 706*a*1. FIG. 10 provides only a possible implementation for reference. A structure of a corresponding part of the second planar coil winding 703*b* is similar to that of the first planar coil winding 703*a*, and details are not described herein.

The coil module includes the first planar coil winding 703*a* and the second planar coil winding 703*b* that are in series cross-connection, and the two planar coil windings cross in a connection area. The following specifically describes a series cross-connection manner of the two planar coil windings.

Figure 11:
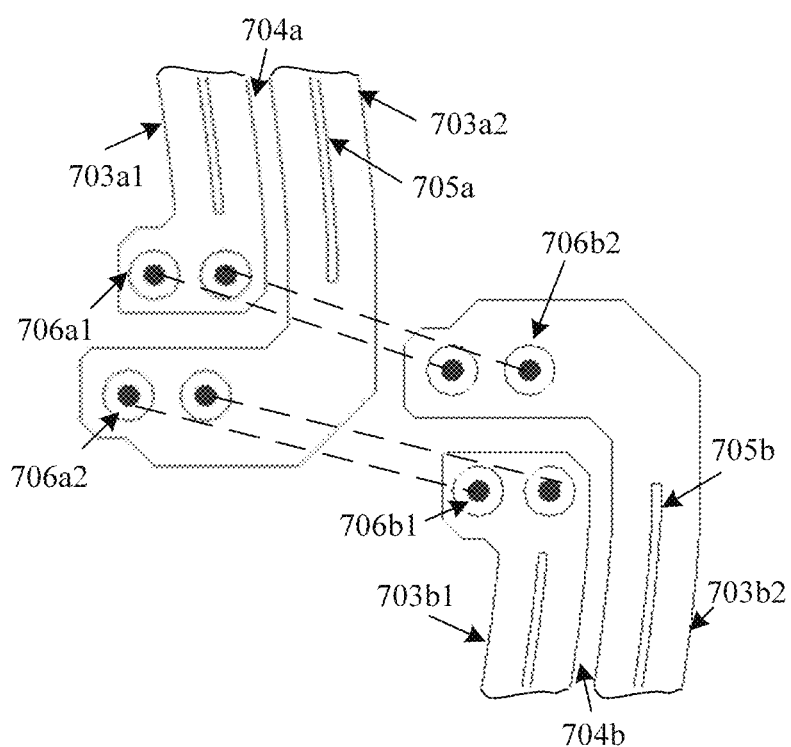
FIG. 11 is a schematic diagram of a series cross-connection manner according to Embodiment 5 of this application.

FIG. 11 is a schematic diagram of a series cross-connection manner according to Embodiment 5 of this application.

At least one of a plurality of turns of coils of a second planar coil winding includes at least one second cutting opening 704*b*, and the second cutting opening 704*b* divides the coil into a second outer side part 703*b*2 and a second inner side part 703*b*1 along an extension direction of the coil. The second outer side part 703*b*2 has a third connection end 706*b*2, and the second inner side part 703*b*1 has a fourth connection end 706*b*1.

A first connection end 706*a*2 of a first planar coil winding is connected to the fourth connection end 706*b*1 of the second planar coil winding, and a second connection end 706*a*1 of the first planar coil winding is connected to the third connection end 703*b*2 of the second planar coil winding. A connection manner is represented by dashed lines in FIG. 11.

A series cross-connection between the first planar coil winding and the second planar coil winding is specifically that the first connection end of the first planar coil winding is connected to the fourth connection end of the second planar coil winding, and the second connection end of the first planar coil winding is connected to the third connection end of the second planar coil winding. To be specific, a connection end of a first outer side part of the first planar coil winding is correspondingly connected to a connection end of the second inner side part of the second planar coil winding, and a connection end of a first inner side part of the first planar coil winding is correspondingly connected to a connection end of the second outer side part of the second planar coil winding, to implement the series cross-connection.

Figure 12:
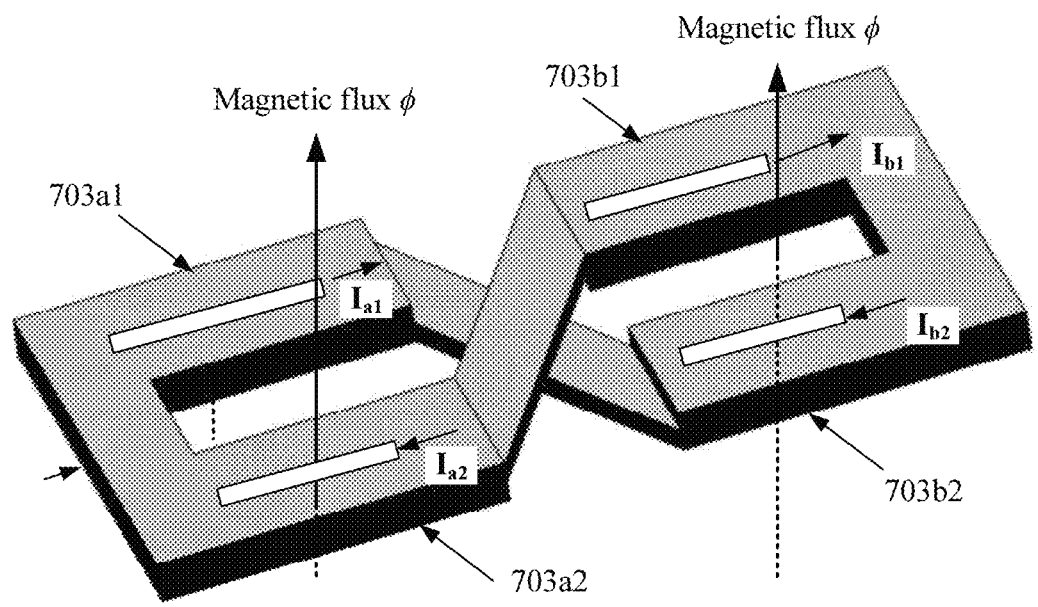
FIG. 12 is a schematic diagram of a principle of reducing a circulating current loss in FIG. 8A to FIG. 11 according to Embodiment 5 of this application.

FIG. 12 is a schematic diagram of a principle of reducing a circulating current loss in FIG. 8A to FIG. 11.

When an external magnetic field passes through a cutting opening, induced currents are generated on the coil windings due to electromagnetic induction, and the induced currents are specifically an induced current $I_{a1}$ on the first inner side part 703*a*1 of the first planar coil winding, an induced current $I_{a2}$ on the first outer side part 703*a*2 of the first planar coil winding, an induced current $I_{b1}$ on the second inner side part 703*b*1 of the second planar coil winding, and an induced current $I_{b2}$ on the second outer side part 703*b*2 of the second planar coil winding.

After the foregoing series cross-connection, directions of the induced current $I_{a1}$ and the induced current $I_{b2}$ may be opposite, and directions of the induced current $I_{b1}$ and the induced current $I_{a2}$ may be opposite. Therefore, the induced currents generated by an alternating current magnetic field can be weakened. In this way, a circulating current loss is reduced, and wireless charging efficiency is further increased.

It should be noted that the planar coil winding is a conductive pattern obtained by winding a conductor. The conductive pattern is not specifically limited in this embodiment of this application. For example, the conductive pattern may be ring-shaped, elliptical ring-shaped, or the like. A width of the at least one of the plurality of turns of coils of the planar coil winding may be different from a width of another turn of coil.

It should be noted that words such as "first" and "second" in this embodiment are only used to distinguish parts that have a same name on the two planar coil windings for ease of description, and do not constitute a limitation on the coil module in this embodiment.

Any first planar coil winding provided in coil module Embodiment 2 and any second planar coil winding provided in coil module Embodiment 4 are still used to perform series cross-connection to constitute a coil module. The following uses an example in which each of an outer side part and an inner side part of each planar coil winding includes one cutting groove for description.

The cutting groove in the coil module described in this application is a continuous groove and blind groove.

Figure 13:
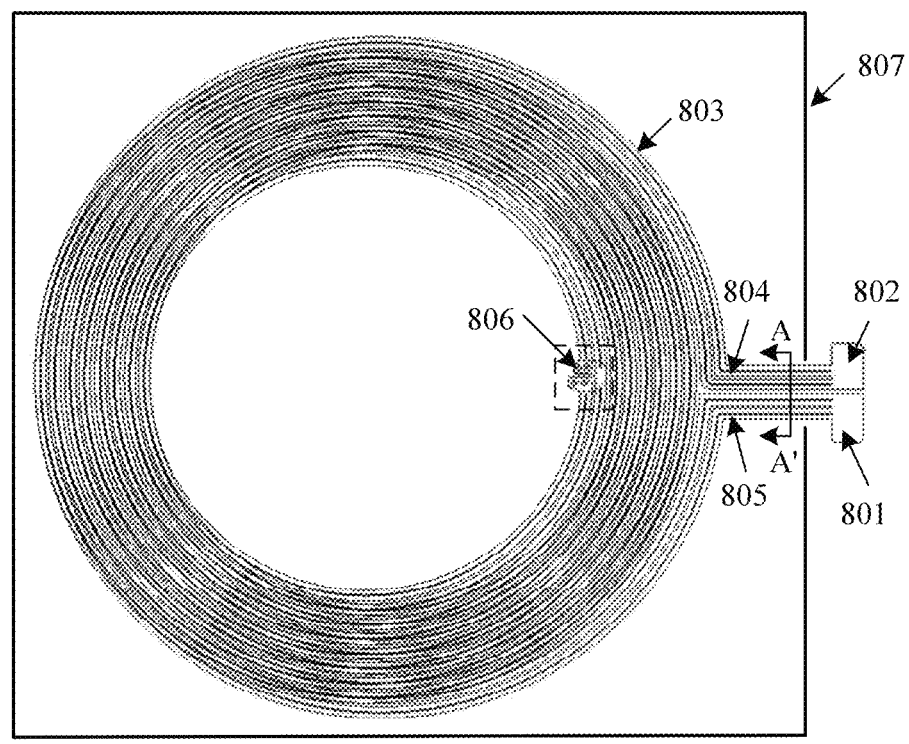
FIG. 13 is a schematic structural diagram of still another coil module according to Embodiment 6 of this application.
Figure 14:
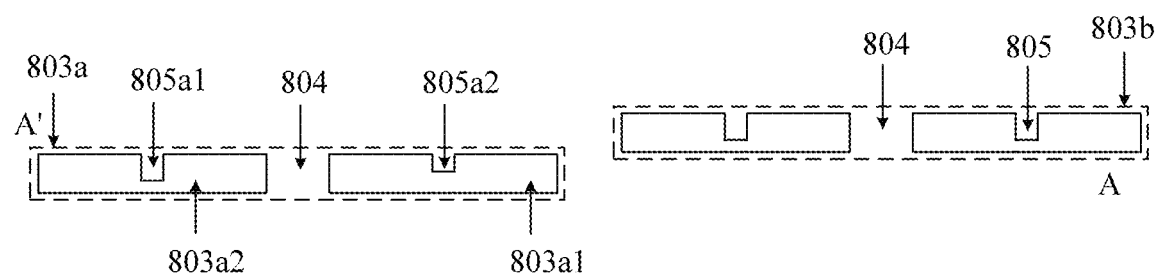
FIG. 14 is a sectional view of a location AA' in FIG. 13 according to Embodiment 6 of this application.

FIG. 13 is a schematic structural diagram of still another coil module according to Embodiment 6 of this application. FIG. 14 is a sectional view of a location AA' in FIG. 13.

The coil module provided in this embodiment includes an input terminal 801, an output terminal 802, planar coil windings 803, cutting openings 804, cutting grooves 805, connection ends 806, and a magnetic conductive sheet 807. The planar coil windings 803 include a first planar coil winding 803a and a second planar coil winding 803b. Refer to FIG. 14.

A same part in this embodiment as that in Embodiment 5 is not described herein. A difference lies in that the cutting groove in coil module Embodiment 5 is a through groove while the cutting groove in this embodiment is a blind groove. The following provides specific description with reference to the accompanying drawings.

The first planar coil winding 803a close to an end A' is used as an example for description. The cutting opening 804 divides each turn of coil of the first planar coil winding 803a into a first inner side part 803a1 and a first outer side part 803a2 along an extension direction of the coil. Each of the first inner side part 803a1 and the first outer side part 803a2 includes one first cutting groove along the extension direction of the coil, and first cutting grooves are respectively 805a1 and 8051a2. As shown in FIG. 14, the first cutting grooves 805a1 and 8051a2 are blind grooves, and depths of the blind grooves of the first inner side part 803a1 and the first outer side part 803a2 may be the same or may be different. For a same blind groove, cutting depths of blind grooves along the extension direction of the coil may be the same or may be different. This is not specifically limited in this application. A structure of the second planar coil winding 803b close to an end A is similar to that of the first planar coil winding 803a close to the end A', and details are not described herein.

Both the first cutting groove corresponding to 805a1 and the first cutting groove corresponding to 805a2 in FIG. 14 are blind grooves. In addition, the first cutting grooves corresponding to 805a1 and 805a2 may alternatively be a combination of a blind groove and a through groove. For example, in FIG. 14, the first cutting groove corresponding to 805a1 is a blind groove, and the first cutting groove corresponding to 805a2 is a through groove. A specific combination manner of the blind groove and the through groove is not specifically limited in this application.

Figure 15:
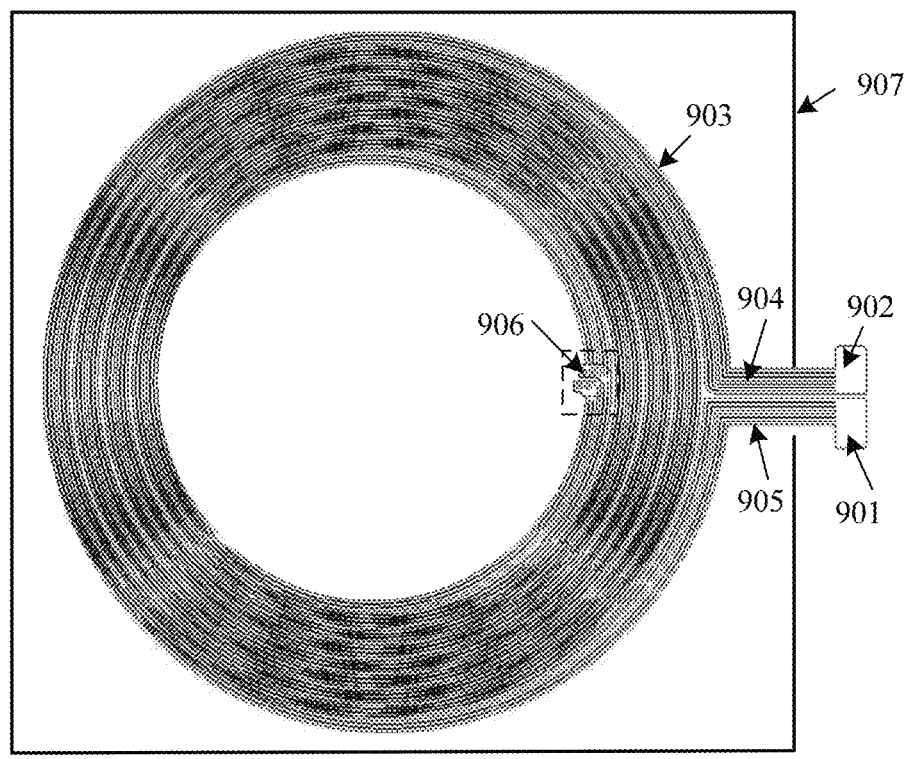
FIG. 15 is a schematic structural diagram of yet another coil module according to Embodiment 7 of this application.
Figure 16:
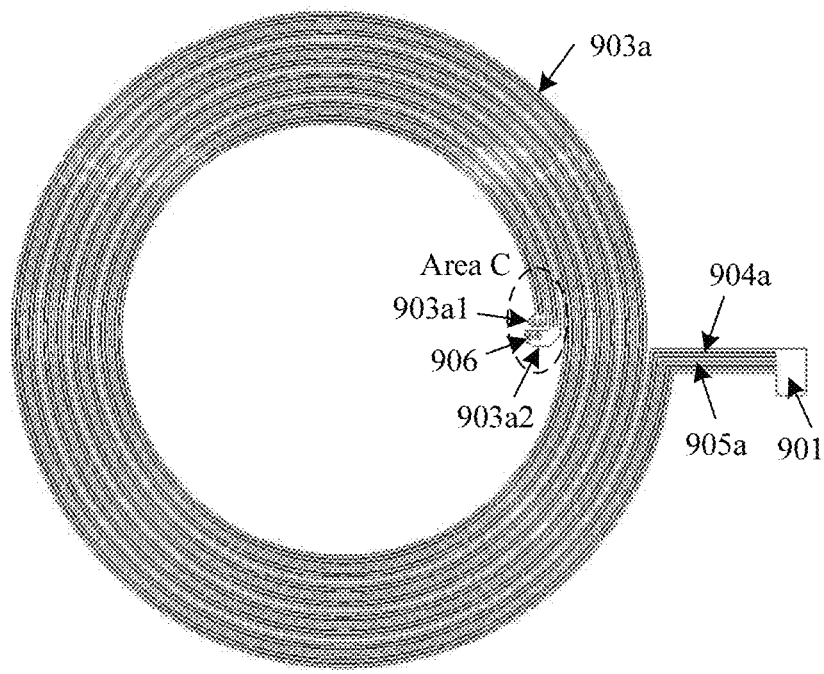
FIG. 16 is a schematic structural diagram of a first planar coil winding corresponding to FIG. 15.
Figure 17:
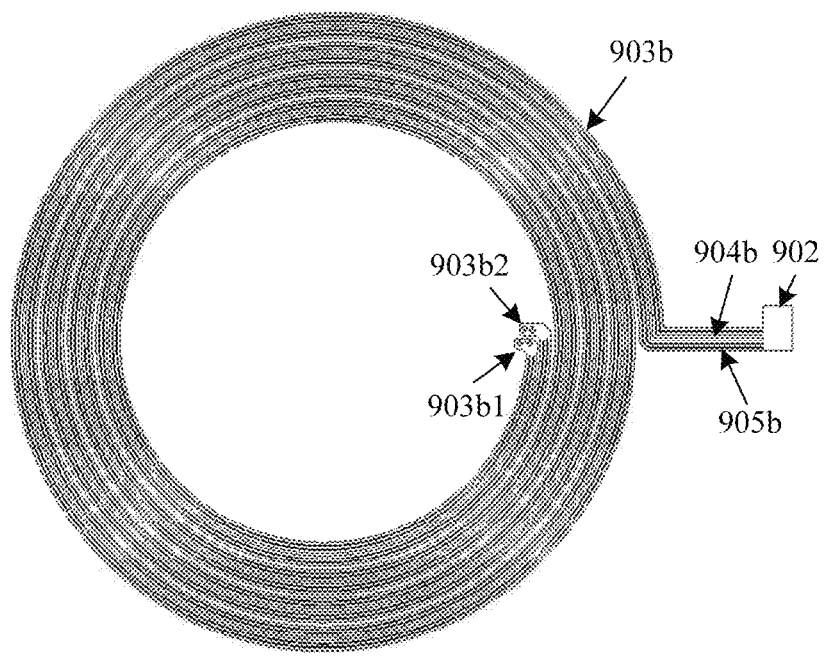
FIG. 17 is a schematic structural diagram of a second planar coil winding corresponding to FIG. 15.

FIG. 15 is a schematic structural diagram of yet another coil module according to Embodiment 7 of this application. In this embodiment, two planar coil windings are in series cross-connection, and each of an outer side part and an inner side part of each planar coil winding includes two cutting grooves. FIG. 16 is a schematic structural diagram of a first planar coil winding of yet another coil module according to Embodiment 7 of this application. FIG. 17 is a schematic structural diagram of a second planar coil winding of yet another coil module according to Embodiment 7 of this application.

The coil module provided in this embodiment includes an input terminal 901, an output terminal 902, planar coil windings 903, a cutting opening 904, cutting grooves 905, connection ends 906, and a magnetic conductive sheet 907. The planar coil windings 903 include a first planar coil winding 903a and a second planar coil winding 903b.

It should be noted that a same part of the coil module provided in this embodiment as that in coil module Embodiment 5 is not described herein.

A difference lies in that each of the outer side part and the inner side part of each planar coil winding in coil module Embodiment 5 includes only one cutting groove, and each of the outer side part and the inner side part of each planar coil winding in this embodiment includes two cutting grooves. The following provides description with reference to the accompanying drawings.

Figure 18:
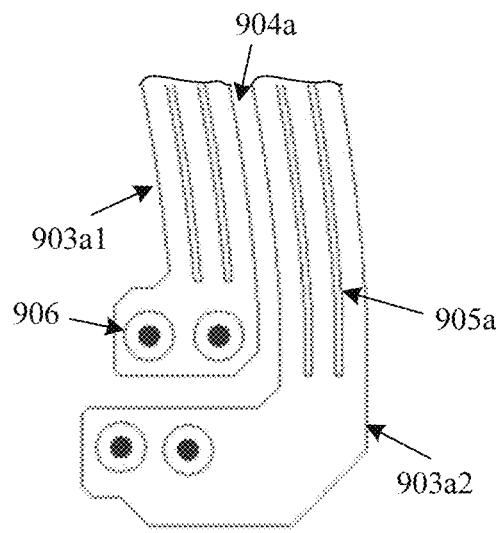
FIG. 18 is an enlarged diagram corresponding to an area C in FIG. 16 according to Embodiment 7 of this application.

The first planar coil winding 903a is used as an example, and reference may alternatively be made to FIG. 18. FIG. 18 is an enlarged diagram corresponding to an area C in FIG. 16.

A first cutting opening 904a divides each turn of coil of the first planar coil winding 903a into a first inner side part 903a1 and a first outer side part 903a2 along an extension direction of the coil. Each of the first inner side part 903a1 and the first outer side part 903a2 includes two first cutting grooves 905a along the extension direction of the coil. Lengths and widths of first cutting grooves 905a may be the same, or may be different. A distance between two first cutting grooves 905a of the first inner side part 903a1 may be the same as or different from a distance between two first cutting grooves 905a of the first outer side part 903a2.

It may be understood that the first cutting grooves 905a may be any combination of a blind groove and/or a through groove. In addition, a quantity of first cutting grooves 905a may continue to be extended. For example, each of the first outer side part 903a2 and the first inner side part 903a1 may include three first cutting grooves 905a. Start ends and termination ends of a plurality of first cutting grooves 905a may be arranged in a neatly manner, or may be arranged in a staggered manner. In addition, a total width of the first cutting grooves 905a in the first inner side part 903a1 is less than or equal to a width of a single first cutting opening 904a, and a total width of the first cutting grooves 905a in the first outer side part 903a2 is less than or equal to a width of a single first cutting opening 904a.

A structure of the second planar coil winding 903b is similar to that of first planar coil winding 903a, and details are not described herein.

The coil module provided in this embodiment includes a plurality of cutting grooves. A larger quantity of cutting grooves indicates that an eddy current path can be more effectively cut off, thereby greatly reducing an eddy current loss, and further reducing a ratio of alternating current impedance to direct current impedance of the coil. The direct current impedance of the coil increases as a quantity of cutting grooves increases, and the ratio of alternating current impedance to direct current impedance of the coil decreases as the quantity of cutting grooves increases. Therefore, a specific quantity of cutting grooves may be adjusted in actual application.

The following describes a coil module provided in Embodiment 8 of this application. In the coil module, two planar coil windings are in series cross-connection, and a cutting groove is a segment groove. A difference of the coil module provided in this embodiment from the coil module in any one of Embodiment 5 to Embodiment 7 lies in that the cutting groove is a segment groove, and the cutting groove in any one of coil module Embodiment 5 to coil module Embodiment 7 is a continuous groove.

The continuous groove is opposite to the segment groove, and the blind groove is opposite to the through groove. Therefore, when at least one cutting groove existing in any planar coil winding is the continuous groove or the segment groove, the cutting grooves may be any combination of the blind groove and/or the through groove.

The following uses an example in which each of a first outer side part and a first inner side part of each planar coil winding includes one cutting groove, and all cutting grooves are segment grooves for description.

Figure 19:
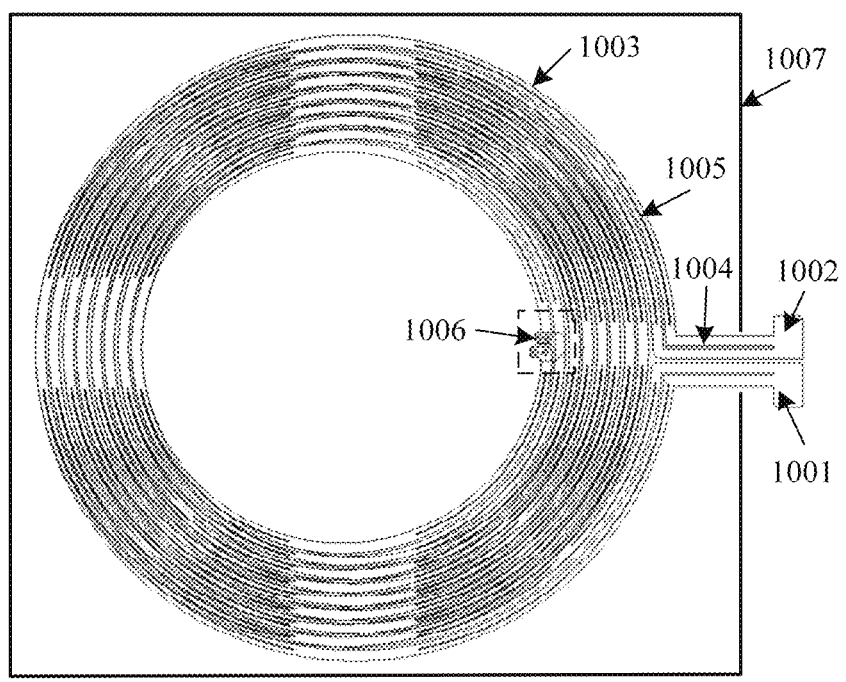
FIG. 19 is a schematic structural diagram of another coil module according to Embodiment 8 of this application.

FIG. 19 is a schematic structural diagram of another coil module according to Embodiment 8 of this application.

The coil module provided in this embodiment includes an input terminal 1001, an output terminal 1002, planar coil windings 1003, cutting openings 1004, cutting grooves 1005, connection ends 1006, and a magnetic conductive sheet 1007. The planar coil windings 1003 include a first planar coil winding 1003a and a second planar coil winding 1003b that are respectively shown in FIG. 20 and FIG. 21.

Figure 20:
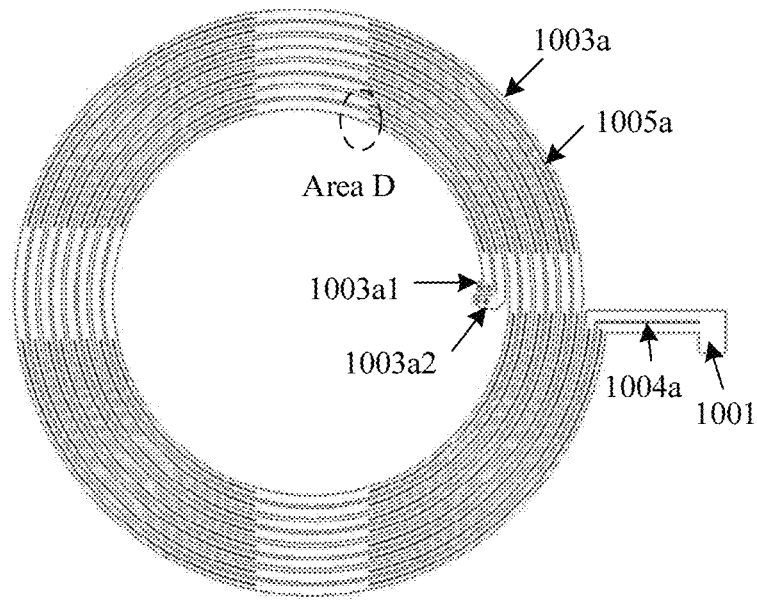
FIG. 20 is a schematic structural diagram of a first planar coil winding corresponding to FIG. 19.
Figure 21:
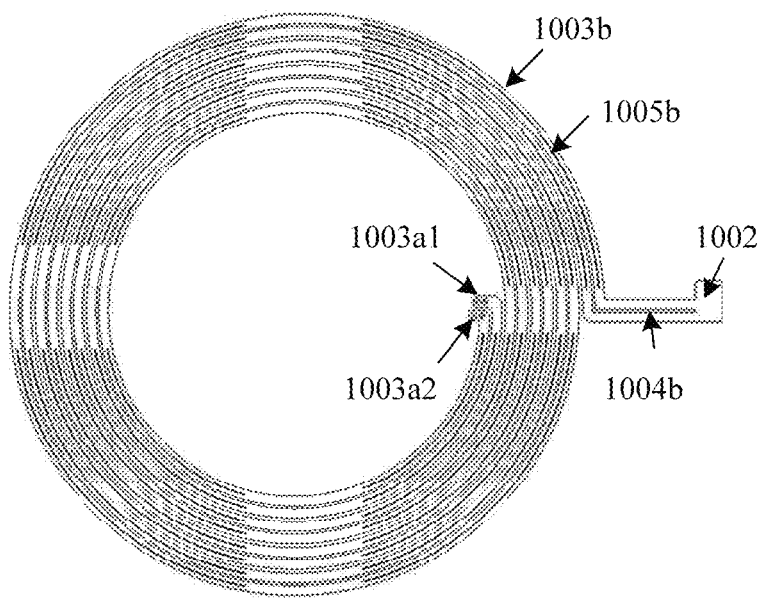
FIG. 21 is a schematic structural diagram of a second planar coil winding corresponding to FIG. 19.

In FIG. 20, a first cutting opening on the first planar coil winding 1003a is represented by 1004a, and a first cutting groove on the first planar coil winding 1003a is represented by 1005a. In FIG. 21, a second cutting opening on the second planar coil winding 1003b is represented by 1004b, and a second cutting groove on the second planar coil winding 1003b is represented by 1005b.

Figure 22:
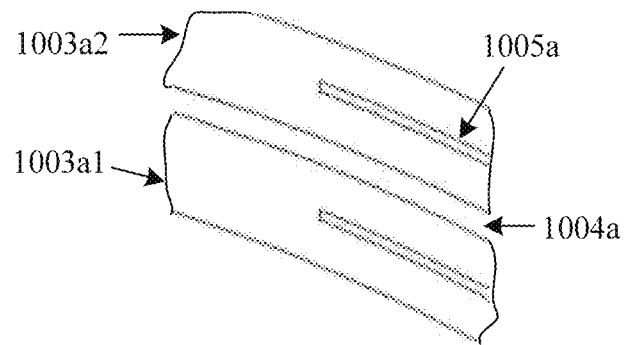
FIG. 22 is an enlarged diagram corresponding to an area D in FIG. 20.

For an enlarged diagram corresponding to an area D in FIG. 20, refer to FIG. 22. The following describes a structure of the D area in detail with reference to FIG. 20 and FIG. 22.

The area D includes a part of a turn of coil of the first planar coil winding 1003a in FIG. 20, and a first inner side part 1003a1 and a first outer side part 1003a2 are obtained by dividing the first planar coil winding 1003a by the first cutting opening 1004a. One first cutting groove 1005a exists on each of the first inner side part 1003a1 and the first outer side part 1003a2, and the first cutting groove 1005a is a segment groove. In addition, segment gap lengths of first cutting grooves on the first inner side part 1003a1 and the first outer side part 1003a2 may be the same or may be different, and a first cutting grooves on the first inner side part 1003a1 and a first cutting grooves on the first outer side part 1003a2 may be arranged in a symmetrical manner or may be arranged in a staggered manner.

In this embodiment, only an example in which each of the first inner side part 1003a1 and the first outer side part 1003a2 includes one first cutting groove 1005a is used for description with reference to the accompanying drawings. Certainly, each of the first inner side part 1003a1 and the first outer side part 1003a2 may include a plurality of first cutting grooves 1005a. However, a total width of all first cutting grooves 1005 of the first inner side part 1003a1 needs to be less than or equal to a width of a single first cutting opening 1004a, and a total width of all first cutting grooves 1005 of the first outer side part 1003a2 needs to be less than or equal to the width of the single first cutting opening 1004a.

A structure of the second planar coil winding 1003b is similar to that of the first planar coil winding 1003a described above in detail, and details are not described herein.

For ease of description and understanding, the following uses an example in which each of a first outer side part and a first inner side part of each planar coil winding includes two cutting grooves, and the cutting grooves are a combination of a continuous groove and a segment groove for description.

Figure 23:
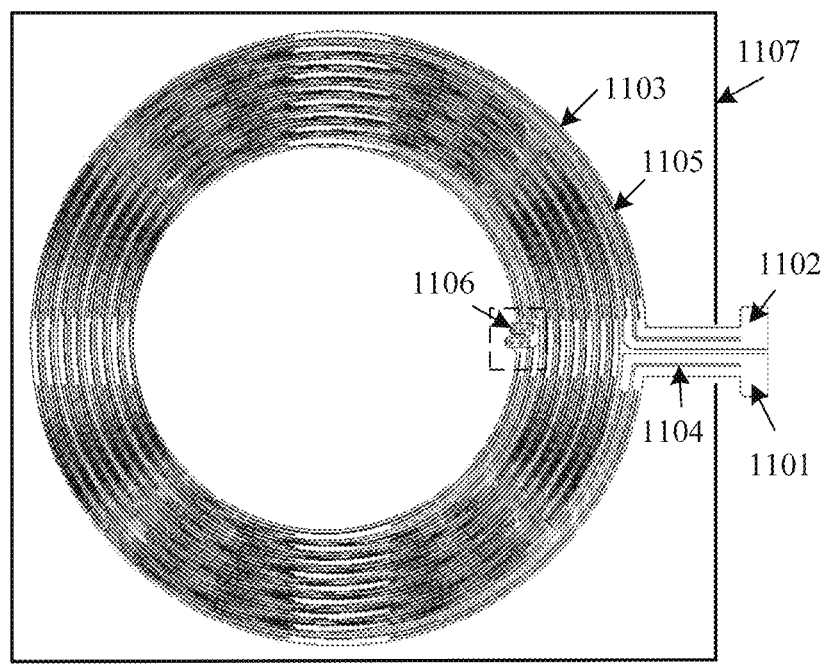
FIG. 23 is a schematic structural diagram of still another coil module according to Embodiment 9 of this application.

FIG. 23 is a schematic structural diagram of still another coil module according to coil module Embodiment 9 of this application. In this embodiment, two planar coil windings included in the coil module are in series cross-connection, each of a first outer side part and a first inner side part of each planar coil winding includes at least two cutting grooves, and the cutting grooves are a combination of a segment groove and a continuous groove.

The coil module provided in this embodiment includes an input terminal 1101, an output terminal 1102, planar coil windings 1103, a cutting opening 1104, cutting grooves 1105, connection ends 1106, and a magnetic conductive sheet 1107. The planar coil windings 1103 include a first planar coil winding 1103a and a second planar coil winding 1103b that are respectively shown in FIG. 24 and FIG. 25.

Figure 24:
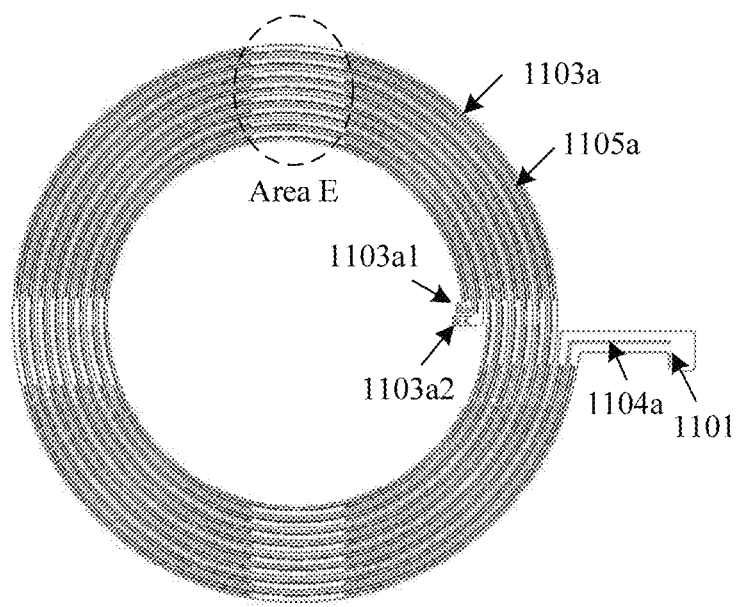
FIG. 24 is a schematic structural diagram of a first planar coil winding corresponding to FIG. 23.
Figure 25:
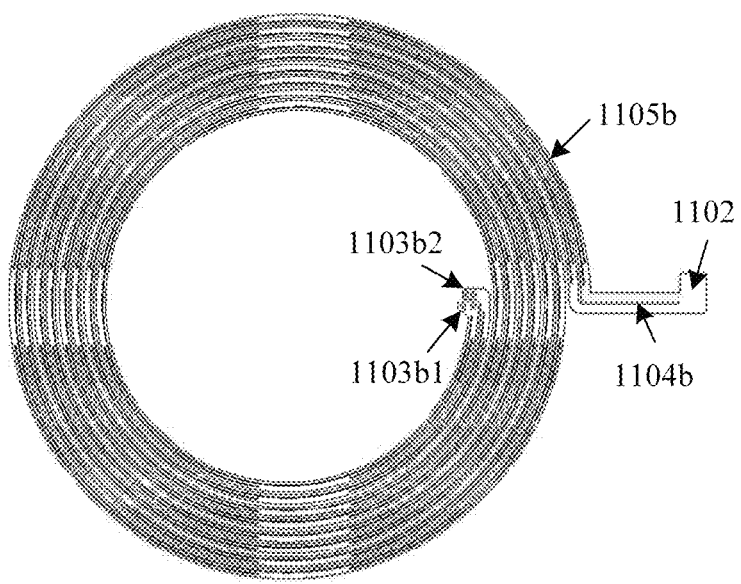
FIG. 25 is a schematic structural diagram of a second planar coil winding corresponding to FIG. 23.

In FIG. 24, a first cutting opening on the first planar coil winding 1103a is represented by 1104a, and a first cutting groove on the first planar coil winding 1103a is represented by 1105a. In FIG. 25, a second cutting opening on the second planar coil winding 1103b is represented by 1104b, and a second cutting groove on the second planar coil winding 1003b is represented by 1105b.

Figure 26:
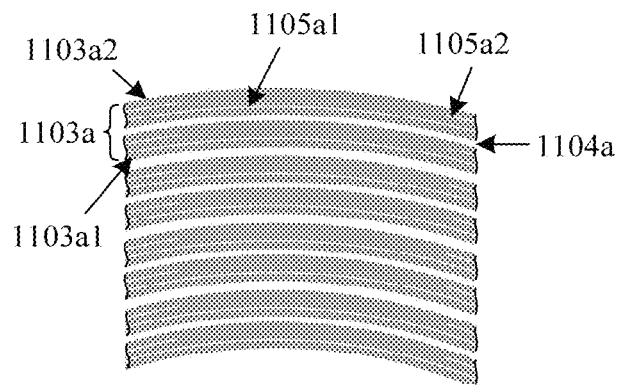
FIG. 26 is an enlarged diagram corresponding to an area E in FIG. 24 according to Embodiment 9 of this application.

FIG. 26 is an enlarged diagram corresponding to an area E in FIG. 24.

The area E includes a part of a coil on the first planar coil winding, a first inner side part 1103a1 and a first outer side part 1103a2 are obtained by dividing the first planar coil winding by the first cutting opening 1104a, and two first cutting grooves exist on each of the first inner side part 1103a1 and the first outer side part 1103a2. One first cutting groove represented by 1105a1 is a continuous groove, and one first cutting groove represented by 1105a2 is a segment groove.

Widths of the two first cutting grooves represented by 1105a1 and 1105a2 may be the same or may be different.

In addition, in another possible implementation, the first cutting groove corresponding to 1105a1 may be further set as a segment groove, and the first cutting groove corresponding to 1105a2 may be set as a continuous groove. To be specific, in each strand of coil divided by a cutting opening, a segment groove is disposed on a side close to a center of a planar coil winding, and a continuous groove is disposed on a side far away from the center of the planar coil winding.

It may be understood that, in this embodiment, only an example in which each of a first outer side part and a first inner side part of each planar coil winding includes one continuous groove and one segment groove is used for description. However, a quantity of first cutting grooves 1105a may continue to be extended to more first cutting grooves. A proportion and location distribution of the continuous groove and the segment groove in the first cutting grooves 1105a are not specifically limited in this embodiment of this application. However, a total width of first cutting grooves 1105 that are in parallel in the first inner side part 1103a1 needs to be less than or equal to a width of a single first cutting opening 1104a, and a total width of first cutting grooves 1105 that are in parallel in the first outer side part 1103a2 is less than or equal to the width of the single first cutting opening 1104a.

A structure of the second planar coil winding 1103b is similar to that of the first planar coil winding 1103a described above in detail, and details are not described herein.

The following describes Embodiment 10 of this application. In this embodiment, two planar coil windings included in a coil module are in series cross-connection, and overlapping of cutting openings and cutting grooves of the two planar coil windings exceeds preset proportions.

A difference between the coil module in this embodiment and the coil module in any one of coil module Embodiment 5 to coil module Embodiment 9 lies in that in the coil module in this embodiment, a first cutting opening on a first planar coil winding and a second cutting opening on a second planar coil winding overlap in a planar projection direction, where an overlapping proportion is greater than a first preset proportion, and a first cutting groove on the first planar coil winding and a second cutting groove on the second planar coil winding overlap in the planar projection direction, where an overlapping proportion is greater than a second preset proportion. To be specific, projections of the first planar coil winding and the second planar coil winding respectively overlap on a same plane, where overlapping proportions are greater than preset proportions. The same plane is a plane parallel to the first planar coil winding and the second planar coil winding, and the projections are projections of edges of cutting grooves and cutting openings.

Both the first preset proportion and the second preset proportion may be set based on an actual requirement. For example, the first preset proportion is 70%, 85%, or 90%, and the second preset proportion is 70%, 85%, or 90%. The preset proportion is not specifically limited in this application.

Other than connection ends, an input terminal, and an output terminal, cutting grooves and cutting openings of the first planar coil winding and the second planar coil winding of this embodiment almost completely overlap at other locations, to maximize functions of the cutting openings and the cutting grooves. If overlapping proportions of the cutting grooves and the cutting openings on the two planar coil windings are relatively small, a coil on the other side corresponding to an opening groove location continues to be cut by a magnetic field, causing a loss. When the of the cutting grooves and the cutting openings on the two planar coil windings are relatively large, magnetic fluxes that pass through the cutting openings and cutting grooves at two opposite sides of a coil intersection can be kept basically the same, to achieve a better cancellation effect, and reduce losses to a maximum extent.

Figure 27:
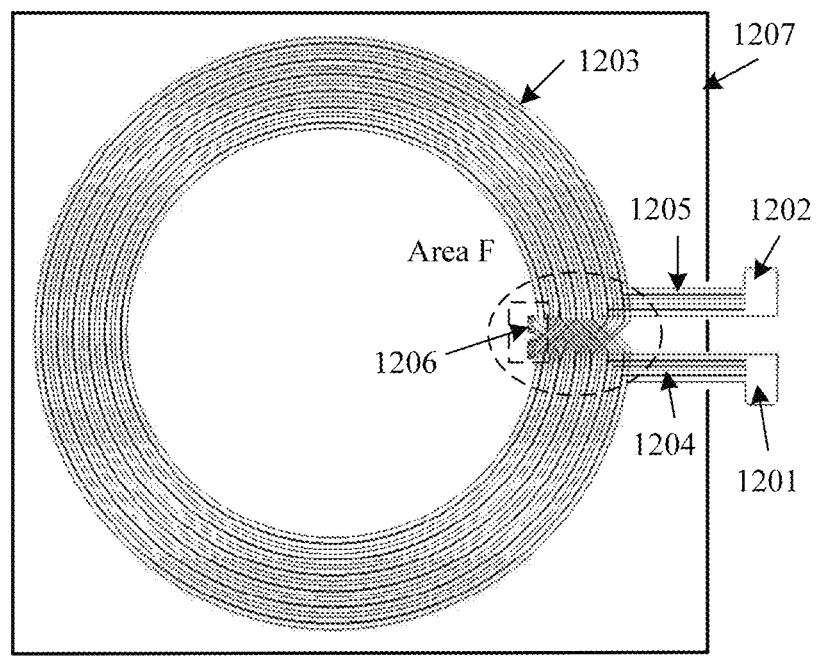
FIG. 27 is a schematic structural diagram of yet another coil module according to Embodiment 10 of this application.

FIG. 27 is a schematic structural diagram of yet another coil module according to coil module Embodiment 10 of this application.

The coil module provided in this embodiment includes an input terminal 1201, an output terminal 1202, planar coil windings 1203, cutting openings 1204, cutting grooves 1205, connection ends 1206, and a magnetic conductive sheet 1207. The planar coil windings 1203 include a first planar coil winding 1203a and a second planar coil winding 1203b that are respectively shown in FIG. 28A and FIG. 28B.

Figure 28A:
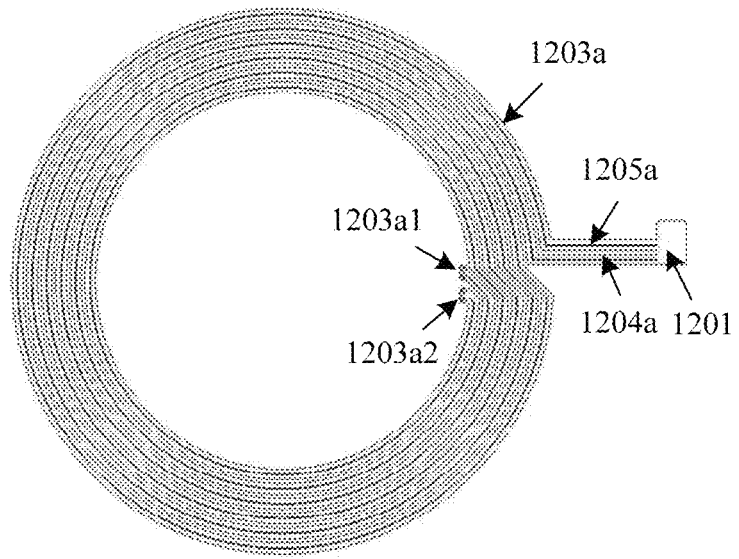
FIG. 28A is a schematic structural diagram of a first planar coil winding corresponding to FIG. 27.
Figure 28B:
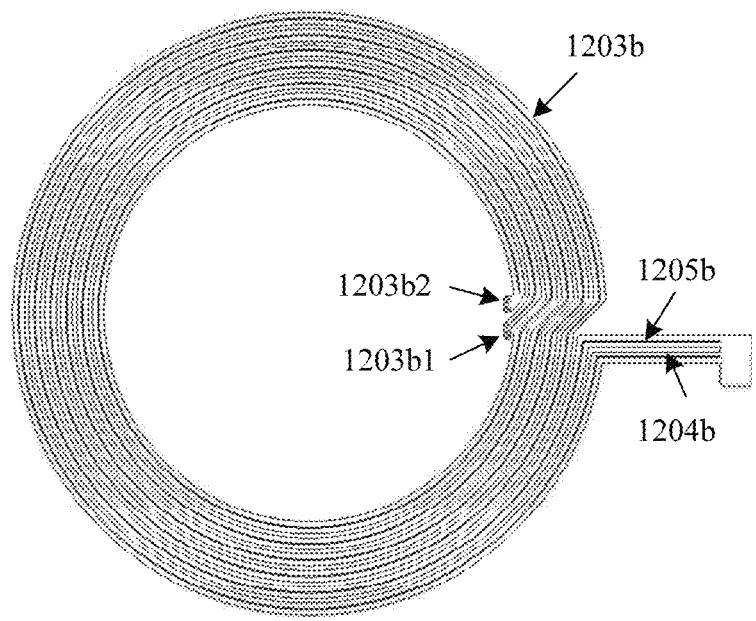
FIG. 28B is a schematic structural diagram of a second planar coil winding corresponding to FIG. 27.

In FIG. 28A, a first cutting opening on the first planar coil winding 1203a is represented by 1204a, and a first cutting groove on the first planar coil winding 1203a is represented by 1205a. The first planar coil winding 1203a has a first connection end 1203a1 and a second connection end 1203a2. In FIG. 28b, a second cutting opening on the second planar coil winding 1203b is represented by 1204b, and a second cutting groove on the second planar coil winding 1203b is represented by 1205b. The second planar coil winding 1203b has a third connection end 1203b1 and a fourth connection end 1203b2.

Figure 28C:
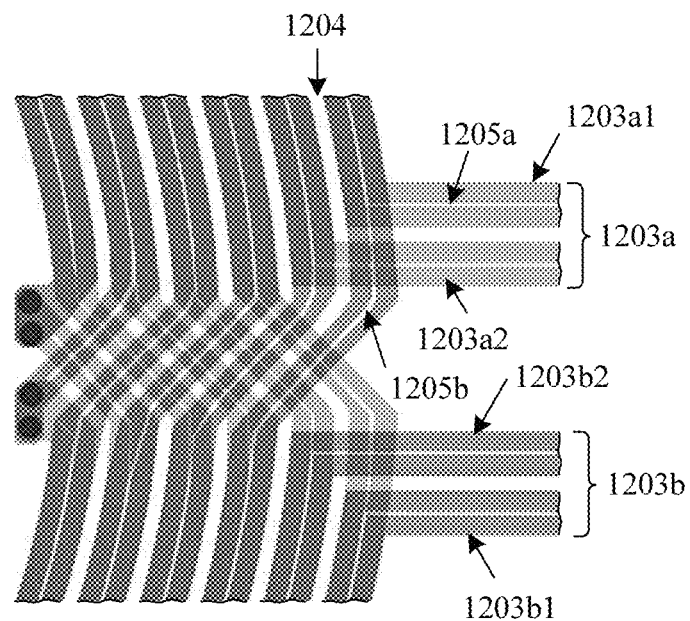
FIG. 28C is an enlarged diagram corresponding to an area F in FIG. 27 according to Embodiment 10 of this application.

FIG. 28C is an enlarged diagram corresponding to an area F in FIG. 27.

The following describes a structure of the coil module in this embodiment in detail with reference to FIG. 27 to FIG. 28C. Other than a part in which the first planar coil winding 1203a is connected to the input terminal, a part in which the second planar coil winding 1203b is connected to the output terminal, and a part of the connection ends, the first cutting opening 1204a on the first planar coil winding 1203a and the second cutting opening 1204b on the second planar coil winding 1203b almost completely overlap in a planar projection direction, and the first cutting groove 1205a on the first planar coil winding 1203a and the second cutting groove 1205b on the second planar coil winding 1203b almost completely overlap in the planar projection direction.

A structure of the second planar coil winding 1203b is similar to that of the first planar coil winding 1203a described above, and details are not described herein.

It may be understood that, in this embodiment, only an example in which each of a first outer side part and a first inner side part of each planar coil winding includes one cutting groove is used for description, but a quantity of cutting grooves may continue to be extended to more cutting grooves.

All connection manners of the first planar coil winding and the second planar coil winding in coil module Embodiment 5 to coil module Embodiment 10 are series cross-connections. The following describes a solution in which the first planar coil winding and the second planar coil winding are in parallel cross-connection.

When the coil module provided in the foregoing embodiment includes two planar coil windings, each of the two planar coil windings includes one cutting opening and one cutting groove. A first planar coil winding of two planar coil windings included in the coil module described in Embodiment 11 of this application includes one cutting opening and one cutting groove, and a second planar coil winding may include only one cutting opening.

The coil module provided in this embodiment includes the first planar coil winding, and further includes the second planar coil winding. At least one of a plurality of turns of coils of the second planar coil winding includes at least one second cutting opening, and the cutting opening divides the coil into a second outer side part and a second inner side part along an extension direction of the coil. The second outer side part has a third connection end, and the second inner side part has a fourth connection end.

A parallel cross-connection between the first planar coil winding and the second planar coil winding is specifically that a first connection end of the first planar coil winding is connected to the fourth connection end of the second planar coil winding, and a second connection end of the first planar coil winding is connected to the third connection end of the second planar coil winding. To be specific, a connection end of a first outer side part of the first planar coil winding is correspondingly connected to a connection end of a second inner side part of the second planar coil winding, and a connection end of a first inner side part of the first planar coil winding is correspondingly connected to a connection end of a second outer side part of the second planar coil winding, to implement the parallel cross-connection.

It may be understood that, for the first planar coil winding, distribution of a first cutting groove may be any distribution of coil module Embodiment 2, and is specifically that only the first outer side part of the first planar coil winding includes one or more first cutting grooves, only the first inner side part of the first planar coil winding includes one or more first cutting grooves, or each of the first inner side part and the first outer side part of the first planar coil winding includes one or more first cutting grooves.

The following uses an example in which each of the first inner side part and the first outer side part of the first planar coil winding includes one first cutting groove for description.

Figure 29:
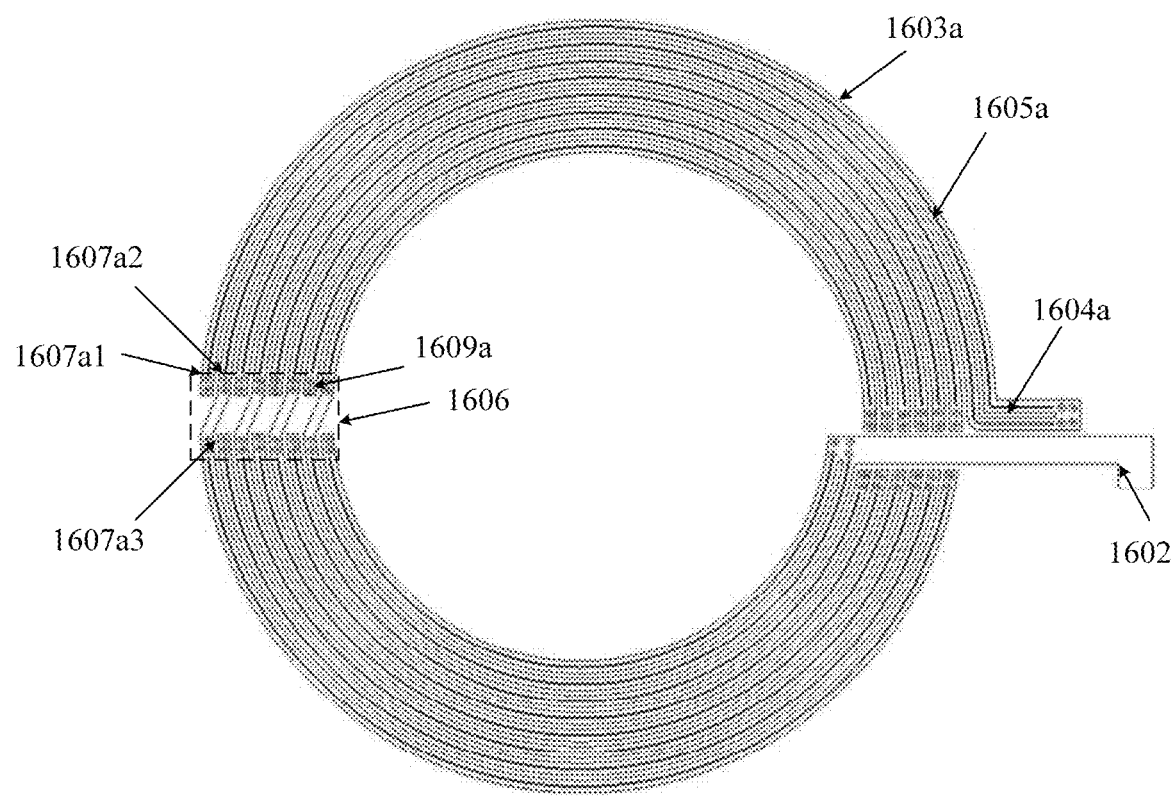
FIG. 29 is a schematic structural diagram of a first planar coil winding of another coil module according to Embodiment 11 of this application.

FIG. 29 is a schematic structural diagram of a first planar coil winding of another coil module according to Embodiment 11 of this application.

The first planar coil winding 1603a includes an input terminal 1602, a first cutting opening 1604a, a first cutting groove 1605*a*, and connection ends 1607*a*. The first cutting opening 1604*a* divides the first planar coil winding 1603*a* into a first outer side part 1603*a*1 and a first inner side part 1603*a*2 along an extension direction of a coil, and each of the first outer side part 1603*a*1 and the first inner side part 1603*a*2 has one first cutting groove.

Figure 30:
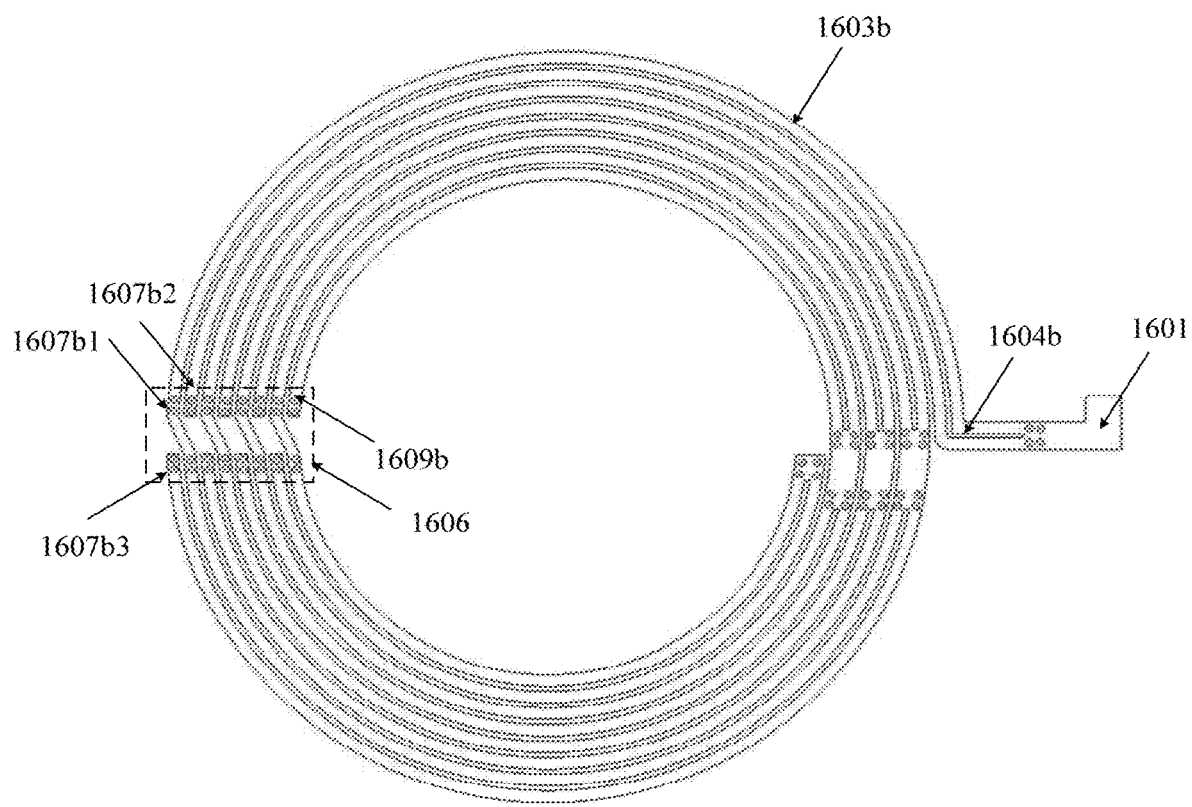
FIG. 30 is a schematic structural diagram of a second planar coil winding of another coil module according to Embodiment 11 of this application.

FIG. 30 is a schematic structural diagram of a second planar coil winding of another coil module according to Embodiment 11 of this application.

The second planar coil winding 1603*b* includes an output terminal 1601, a second cutting opening 1604*b*, and connection ends 1607*b*. The second cutting opening 604*b* divides the second planar coil winding 603*b* into a second outer side part 1603*b*1 and a second inner side part 1603*b*2 along an extension direction of a coil, and the second planar coil winding 1603*b* does not have a cutting groove.

An example in which turns of coil 1607 on outermost sides of the two planar coil windings is used for description. On one side of an area 1606, a turn of coil on an outermost side of the first planar coil winding 1603*a* is divided into the first outer side part and the first inner side part by the first cutting opening 1604*a*. The first outer side part has a first connection end 1607*a*1, and the first inner side part has a second connection end 1607*a*2. On the other side of the area 1606, the second connection end of the first planar coil winding 1603*a* is represented by 1607*a*3.

Similarly, a turn of coil on an outermost side of the second planar coil winding 1603*b* is divided into the second outer side part and the second inner side part by the second cutting opening 1604*b*. The second outer side part has a third connection end 1607*b*1, and the second inner side part has a fourth connection end 1607*b*2. On the other side of the area 1606, the third connection end of the second planar coil winding 1603*b* is represented by 1607*b*3.

When the two planar coil windings are in parallel cross-connection, the second connection end 1607*a*2 of the first planar coil winding 1603*a* is connected to a first outer side part of a same turn of coil on the other side of the area 1606, and the third connection end 1603*b*1 of the second planar coil winding 1603*b* is connected to a second inner side part of a same turn of coil on the other side of the area 1606. After the connection, the turns of coils on the outermost sides of the two planar coil winding cross at the area 1606 (there is no electrical connection at intersection). The second connection end 1607*a*2 of the first planar coil winding 1603*a* is connected to the fourth connecting end 1607*b*2 and the third connecting end 1607*b*3 of the second planar coil winding 1603*b* by using vias, and the third connection end 1607*b*1 of the second planar coil winding 1603*b* is connected to the first connection end 1607*a*1 and the second connection end 1607*a*3 of the first planar coil winding 1603*a* by using vias. Connection manners of other turns of coils of the two planar coil windings at connection ends are similar, and details are not described herein.

By using the foregoing method, the first planar coil winding and the second planar coil winding are in parallel cross-connection, so that a circulating current loss in the coil windings can be reduced, and wireless charging efficiency can be further increased. For details, refer to the principle described in coil module Embodiment 5, and details are not described in this embodiment.

Figure 31:
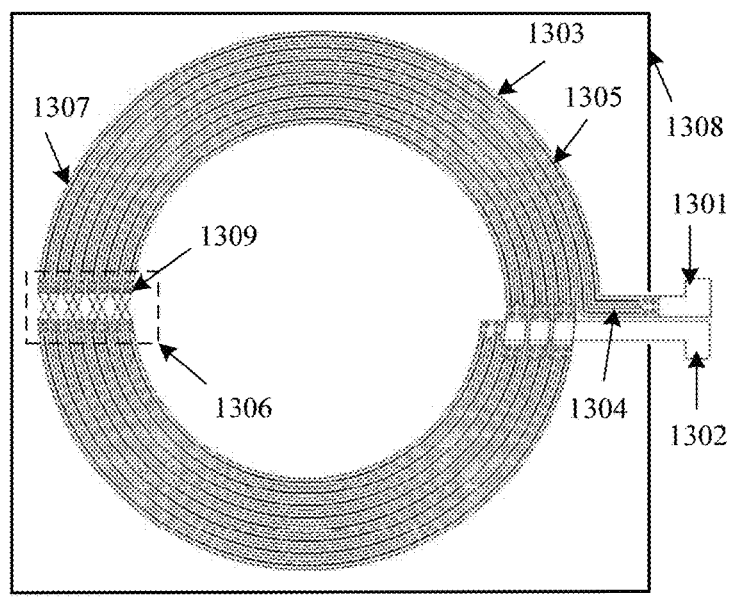
FIG. 31 is a schematic structural diagram of a coil module according to Embodiment 12 of this application.

FIG. 31 is a schematic structural diagram of a coil module according to Embodiment 12 of this application. In this embodiment, a first planar coil winding and a second planar coil winding are in parallel cross-connection.

The coil module provided in this embodiment includes an input terminal 1301, an output terminal 1302, planar coil windings 1303, cutting openings 1304, a cutting groove 1305, a magnetic conductive sheet 1308, and connection ends 1309. Each of the connection end 1309 includes a via.

Figure 32:
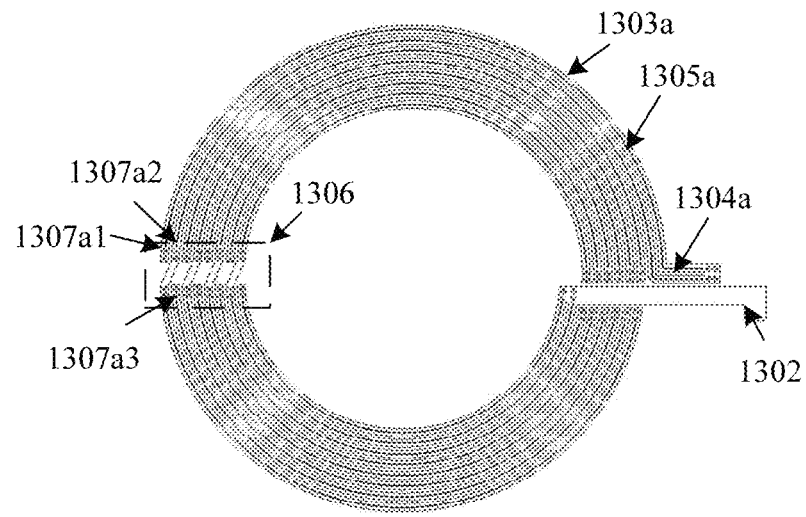
FIG. 32 is a schematic structural diagram of a first planar coil winding corresponding to FIG. 31.
Figure 33:
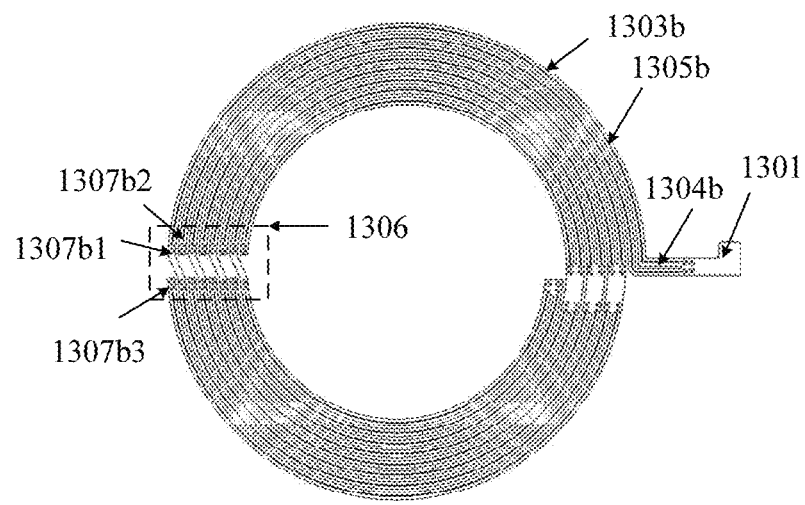
FIG. 33 is a schematic structural diagram of a second planar coil winding corresponding to FIG. 31.

The planar coil windings 1303 include a first planar coil winding 1303*a* and a second planar coil winding 1303*b* that are respectively shown in FIG. 32 and FIG. 33. The first planar coil winding 1303*a* and the second planar coil winding 1303*b* are in parallel cross-connection in an area 1306 shown in FIG. 31.

The following specifically describes a connection manner between the first planar coil winding 1303*a* and the second planar coil winding 1303*b* with reference to FIG. 31 to FIG. 33.

An example in which turns of coils 1307 on outermost sides of the two planar coil windings is used for description. On one side of the area 1306, a turn of coil on an outermost side of the first planar coil winding 1303*a* is divided into a first outer side part and a first inner side part by a first cutting opening 1304*a*. The first outer side part has a first connection end 1307*a*1, and the first inner side part has a second connection end 1307*a*2. On the other side of the area 1306, the second connection end of the first planar coil winding 1303*a* is represented by 1307*a*3.

Similarly, a turn of coil on an outermost side of the second planar coil winding 1303*b* is divided into a second outer side part and a second inner side part by a second cutting opening 1304*b*. The second outer side part has a third connection end 1307*b*1, and the second inner side part has a fourth connection end 1307*b*2. On the other side of the area 1306, the third connection end of the second planar coil winding 1303*b* is represented by 1307*b*3.

When the two planar coil windings are in parallel cross-connection, the second connection end 1307*a*2 of the first planar coil winding 1303*a* is connected to a first outer side part of a same turn of coil on the other side of the area 1306, and the third connection end 1303*b*1 of the second planar coil winding 1303*b* is connected to a second inner side part of a same turn of coil on the other side of the area 1306. After the connection, the turns of coils on the outermost sides of the two planar coil winding cross at the area 1306 (there is no electrical connection at intersection). The second connection end 1307*a*2 of the first planar coil winding 1303*a* is connected to the fourth connection end 1307*b*2 and the third connection end 1307*b*3 of the second planar coil winding 1303*b* by using vias, and the third connection end 1307*b*1 of the second planar coil winding 1303*b* is connected to the first connection end 1307*a*1 and the second connection end 1307*a*3 of the first planar coil winding 1303*a* by using vias. Connection manners of other turns of coils of the two planar coil windings at connection ends are similar, and details are not described herein.

It may be understood that the cutting openings 1304 and the cutting groove 1305 in this embodiment may be in a form of any one of the foregoing coil module embodiments, and details are not described herein.

By using the foregoing method, the first planar coil winding and the second planar coil winding are in parallel cross-connection, so that a circulating current loss in the coil windings can be reduced, and wireless charging efficiency can be further increased. For details, refer to the principle described in coil module Embodiment 5, and details are not described in this embodiment.

The first planar coil winding and the second planar coil winding in coil module Embodiment 12 are connected in a single parallel manner. The following describes a solution in which the first planar coil winding and the second planar coil winding are in series-parallel hybrid cross-connection.

Figure 34:
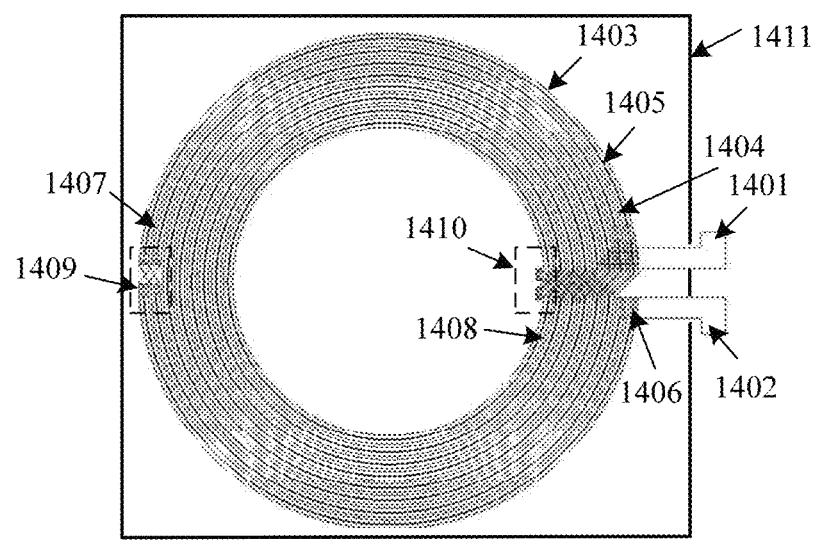
FIG. 34 is a schematic structural diagram of still another coil module according to Embodiment 13 of this application.

FIG. 34 is a schematic structural diagram of still another coil module according to Embodiment 13 of this application.

Figure 35:
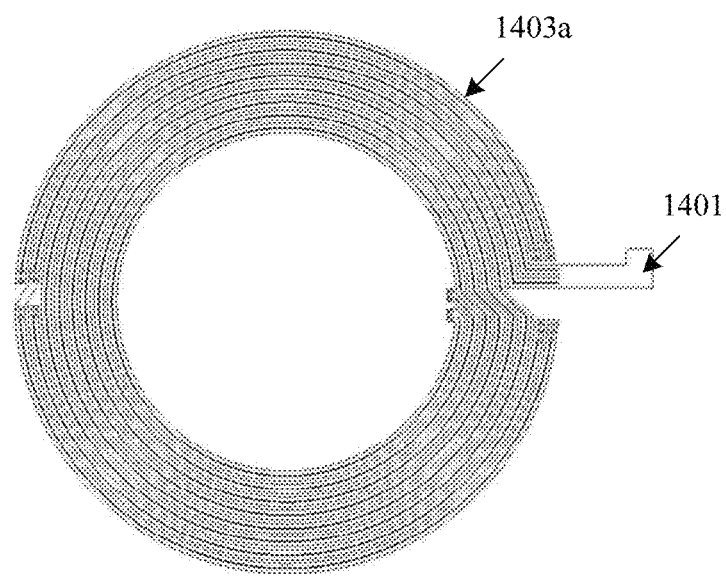
FIG. 35 is a schematic structural diagram of a first planar coil winding corresponding to FIG. 34.
Figure 36:
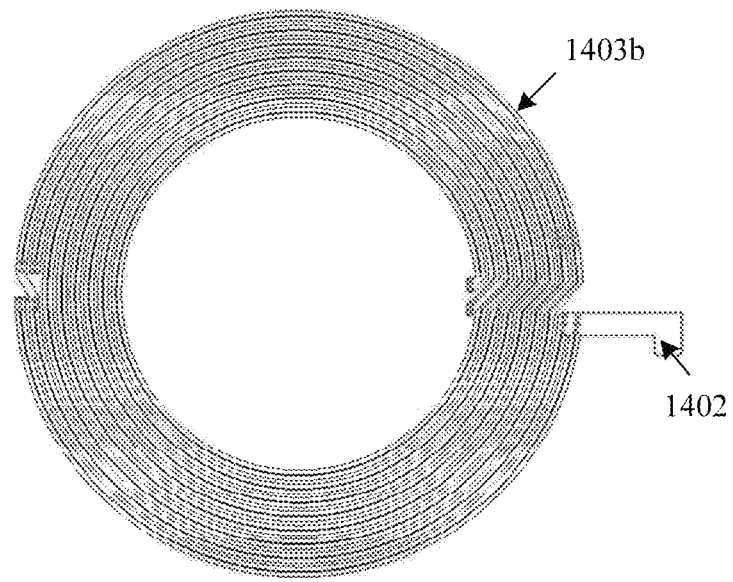
FIG. 36 is a schematic structural diagram of a second planar coil winding corresponding to FIG. 34.

The coil module provided in this embodiment includes an input terminal 1401, an output terminal 1402, planar coil windings 1403, cutting openings 1404, a cutting groove 1405, a first connection area 1409, a second connection area 1410, and a magnetic conductive sheet 1411. The planar coil windings 1403 include a first planar coil winding 1403a and a second planar coil winding 1403b that are respectively shown in FIG. 35 and FIG. 36.

A main difference between this embodiment and the foregoing coil module embodiment lies in that in this embodiment, a turn of coil on an outermost side of the first planar coil winding 1403a is connected in parallel to a turn of coil on an outermost side of the second planar coil winding 1403b, and the turn of coil on an outermost side of the first planar coil winding 1403a and the turn of coil on an outermost side of the second planar coil winding 1403b cross at the first connection area 1409 after being cut by the cutting openings 1404. Three turns of coils on an inner side of the first planar coil winding 1403a is connected in series to three turns of coils on an inner side of the second planar coil winding 1403b, and the three turns of coils on an inner side of the first planar coil winding 1403a and the three turns of coils on an inner side of the second planar coil winding 1403b cross at the second connection area 1410.

For a specific connection manner of the parallel connection and the series connection, refer to related descriptions in the foregoing embodiment. Details are not described herein.

In this embodiment, four turns of coils are used as an example. Turns on outermost sides are in parallel cross-connection, and three turns on inner sides are in series cross-connection. In addition, turns on outermost sides may alternatively be in series cross-connection, and three turns on inner sides may be in parallel cross-connection. Alternatively, turns on outermost sides may be in series cross-connection, and then turns on inner sides may be in parallel cross-connection, and remaining turns may be in series cross-connection. The planar coil winding 1403 may alternatively be a coil having another quantity of turns. In addition, location distribution of connection ends used for series connection and connection ends used for parallel connection is not specifically limited in this embodiment.

Embodiment 14 of this application further provides a coil module, and a part of a coil of each of planar coil windings of the coil module includes only one cutting groove. The following provides specific description with reference to the accompanying drawings.

Figure 37:
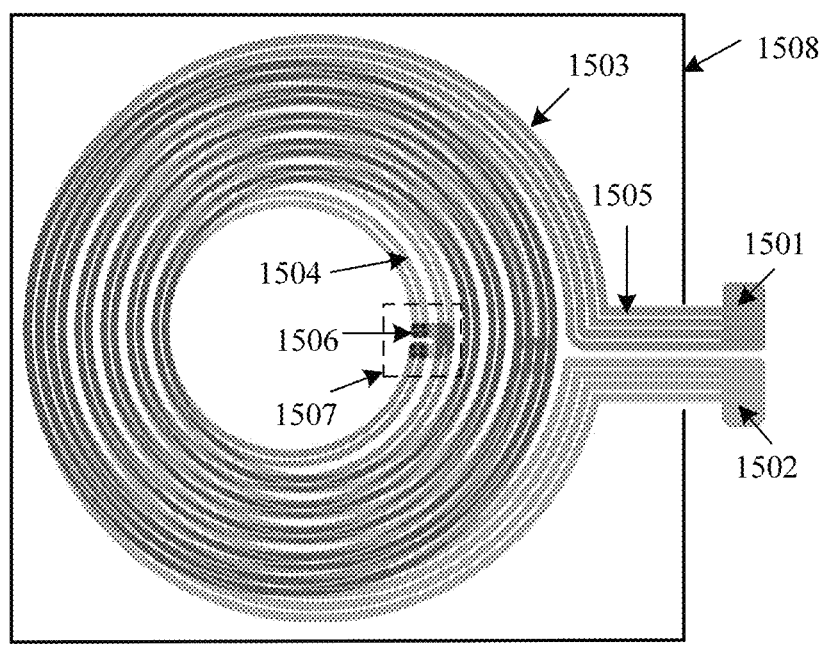
FIG. 37 is a schematic structural diagram of yet another coil module according to Embodiment 14 of this application.

FIG. 37 is a schematic structural diagram of yet another coil module according to coil module Embodiment 14 of this application.

Figure 38:
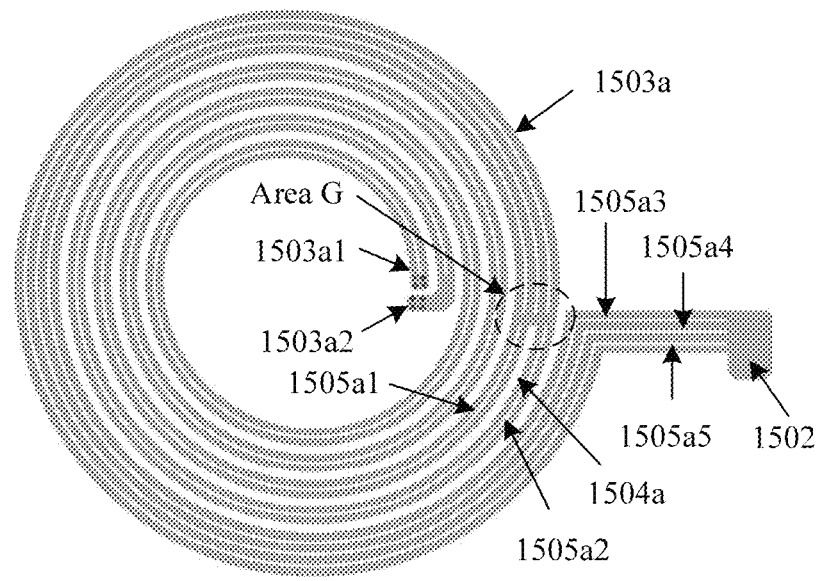
FIG. 38 is a schematic structural diagram of a first planar coil winding corresponding to FIG. 37.

The coil module provided in this embodiment includes an input terminal 1501, an output terminal 1502, planar coil windings 1503, cutting openings 1504, cutting grooves 1505, connection ends 1507, and a magnetic conductive sheet 1508. The planar coil windings 1503 include a first planar coil winding 1503a and a second planar coil winding 1503b that are respectively shown in FIG. 38 and FIG. 39. In FIG. 38, a first cutting opening on the first planar coil winding 1503a is represented by 1504a, and first cutting grooves on the first planar coil winding 1503a are respectively represented by 1505a1, 1505a2, 1505a3, 1505a4, and 1505a5. The first planar coil winding 1503a has a first connection end 1503a1 and a second connection end 1503a2. The first planar coil winding 1503a further has an input terminal 1501.

Figure 39:
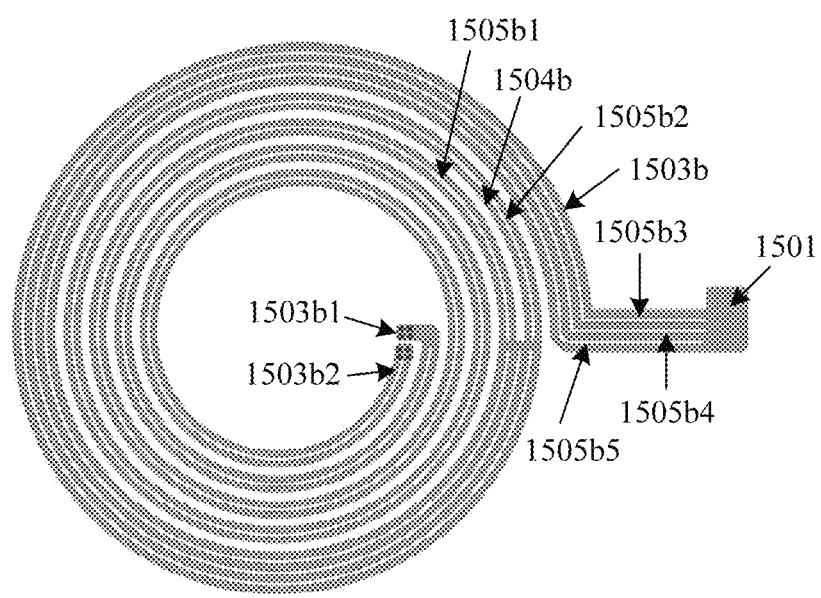
FIG. 39 is a schematic structural diagram of a second planar coil winding corresponding to FIG. 37.

In FIG. 39, a second cutting opening on the second planar coil winding 1503b is represented by 1504b, and second cutting grooves on the second planar coil winding 1503b are respectively represented by 1505b1, 1505b2, 1505b3, 1505b4, and 1505b5. The second planar coil winding 1503b has a third connection end 1503b1 and a fourth connection end 1503b2. The second planar coil winding 1503b further has an output terminal 1502.

In this embodiment, when both the cutting opening 1504 and the cutting groove 1505 are continuous grooves, a length of the cutting groove 1505 is greater than a length of the cutting opening 1504 because the part of the coil includes only one cutting groove.

The first planar coil winding 1503a shown in FIG. 38 is used as an example for description. A turn of coil on an outermost side of the first planar coil winding 1503a is used as the first turn of coil, and the first turn of coil of the first planar coil winding 1503a is divided into a first inner side part and a first outer side part by the first cutting opening 1505a4. The first inner side part has the first cutting groove 1505a3, the first outer side part has the first cutting groove 1505a5, and the first turn of coil does not include a first cutting opening. The first cutting opening 1504a starts to divide, along an extension direction of the coil, the first planar coil winding 1503a into a first inner side part and a first outer side part at the second turn of coil. In this case, the first cutting groove 1505a1 and the first cutting groove 1505a2 are respectively located in the first inner side part and the first outer side part that are formed through division by the first cutting opening 1504a.

Further, this embodiment may be extended as follows a ratio of a quantity of turns of coils having a cutting groove to a total quantity of turns of coils of the planar coil windings is greater than a ratio of a quantity of turns of coils having a cutting opening to the total quantity of turns of coils of the planar coil windings.

As shown in an area G in FIG. 38, the first cutting groove 1505a1 may be connected to the first cutting groove 1505a3, the first cutting groove 1505a2 may also be connected to the first cutting groove 1505a5, and the first cutting opening 1504a may also be connected to the first cutting groove 1505a4. In a coil without a first cutting opening, a total quantity of first cutting grooves may be different from a total quantity of first cutting openings and first cutting grooves in a coil with a first cutting opening. In addition, in the coil without a first cutting opening, a total width of first cutting grooves is less than or equal to a width of a single first cutting opening.

It may be understood that the solution in this embodiment may also be applied to a coil module including two planar coil windings that are in parallel cross-connection or series-parallel hybrid cross-connection.

Based on the coil module provided in the foregoing embodiments, an embodiment of this application further provides a wireless charging transmitting apparatus. The following provides specific description with reference to the accompanying drawings.

Figure 40:
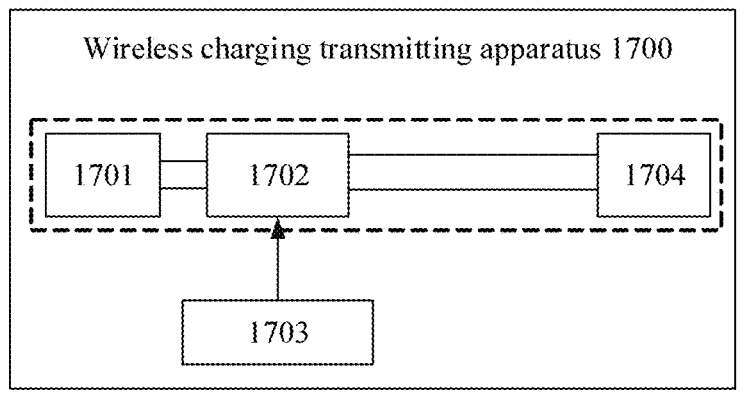
FIG. 40 is a schematic structural diagram of a wireless charging transmitting apparatus according to an embodiment of this application.

FIG. 40 is a schematic structural diagram of a wireless charging transmitting apparatus according to an embodiment of this application.

The wireless charging transmitting apparatus 1700 provided in this embodiment includes an inverter circuit 1702, a control unit 1703, and a coil module 1704 in any one of the foregoing coil module embodiments.

An input end of the inverter circuit 1702 is connected to a direct current power supply 1701, and an output end of the inverter circuit 1702 is connected to the coil module 1704.

Under control of the control unit 1703, the inverter circuit 1702 inverts a direct current output by the direct current power supply 1701 into an alternating current, and outputs the alternating current to the coil module 1704.

A matching circuit may be further disposed between the inverter circuit 1702 and the coil module 1704. To be specific, the alternating current output by the inverter circuit 1702 is matched by using the matching circuit before being output to the coil module 1704. The matching circuit is configured to resonate with the coil module 1704.

The coil module 1704 is configured to transmit the alternating current in an alternating magnetic field manner.

Figure 41:
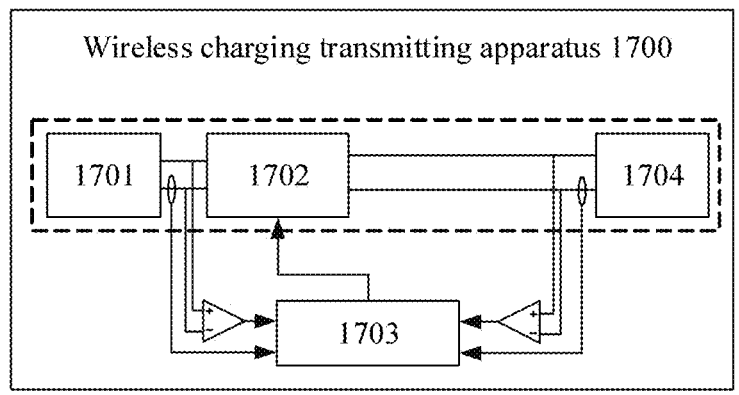
FIG. 41 is a schematic structural diagram of another wireless charging transmitting apparatus according to an embodiment of this application.

FIG. 41 is a schematic structural diagram of another wireless charging transmitting apparatus according to an embodiment of this application.

A control unit 1703 is connected to a direct current power supply 1701 to detect a voltage and a current of the direct current power supply 1701, is further connected to a coil module 1704 to detect a voltage and a current of the coil module 1704, and then controls an inverter circuit 1702 based on the detected voltage and the detected current.

The wireless charging transmitting apparatus may wirelessly charge a wireless charging receiving apparatus. For example, the wireless charging transmitting apparatus may be a wireless charger or the like.

The wireless charging transmitting apparatus provided in this embodiment of this application includes the coil module 1704 provided in the foregoing embodiments. Therefore, a circulating current loss and an eddy current loss of a coil in a wireless charging transmitting process can be reduced, and wireless charging efficiency of the wireless charging transmitting apparatus can be further increased.

Based on the coil module provided in the foregoing embodiments, an embodiment of this application further provides a wireless charging receiving apparatus. The following provides specific description with reference to the accompanying drawings.

Figure 42:
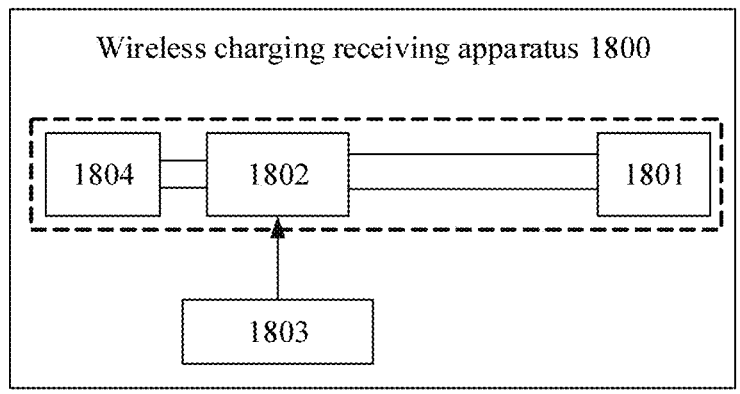
FIG. 42 is a schematic structural diagram of a wireless charging receiving apparatus according to an embodiment of this application.

FIG. 42 is a schematic structural diagram of a wireless charging receiving apparatus according to an embodiment of this application.

The wireless charging receiving apparatus 1800 provided in this embodiment includes a rectifier circuit 1802, a control unit 1803, a load 1801, and a coil module 1804 in any one of the foregoing coil module embodiments.

The coil module 1804 is configured to receive an alternating current in an alternating magnetic field manner.

An input end of the rectifier circuit 1802 is connected to the coil module 1804. The rectifier circuit 1802 is configured to rectify the alternating current to a direct current under control of the control unit 1803, and output the direct current to the load 1801, to provide electric energy for the load 1801.

A matching circuit may be further disposed between the coil module 1804 and the rectifier circuit 1802, and the matching circuit is configured to resonate with the coil module 1804.

Figure 43:
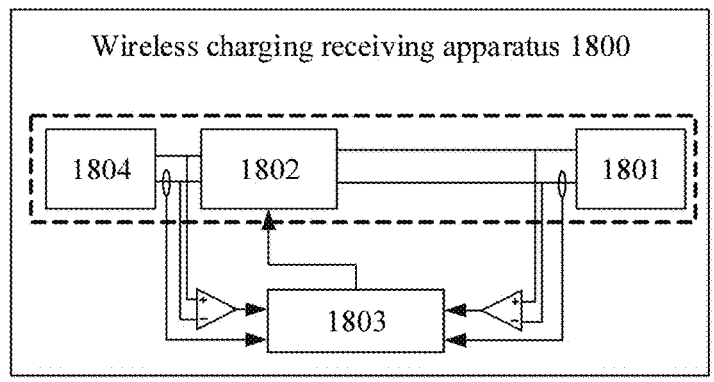
FIG. 43 is a schematic structural diagram of another wireless charging receiving apparatus according to an embodiment of this application.

FIG. 43 is a schematic structural diagram of another wireless charging receiving apparatus according to an embodiment of this application.

A control unit 1803 is connected to a load 1801 to detect a voltage and a current of the load 1801, is further connected to a coil module 1804 to detect a voltage and a current of the coil module 1804, and then controls a rectifier circuit 1802 based on the detected voltage and the detected current.

The wireless charging receiving apparatus 1800 may be wirelessly charged by using a wireless charging transmitting apparatus. For example, the wireless charging receiving apparatus may be an electronic device such as a mobile phone or a tablet computer.

The wireless charging receiving apparatus provided in this embodiment of this application includes the coil module 1804 provided in the foregoing embodiments. Therefore, a circulating current loss and an eddy current loss of a coil in a wireless charging receiving process can be reduced, and wireless charging efficiency of the wireless charging receiving apparatus can be further increased.

Based on the coil module, the wireless charging transmitting apparatus, and the wireless charging receiving apparatus that are provided in the foregoing embodiments, an embodiment of this application further provides a wireless charging system. The following provides specific description with reference to the accompanying drawing.

Figure 44:
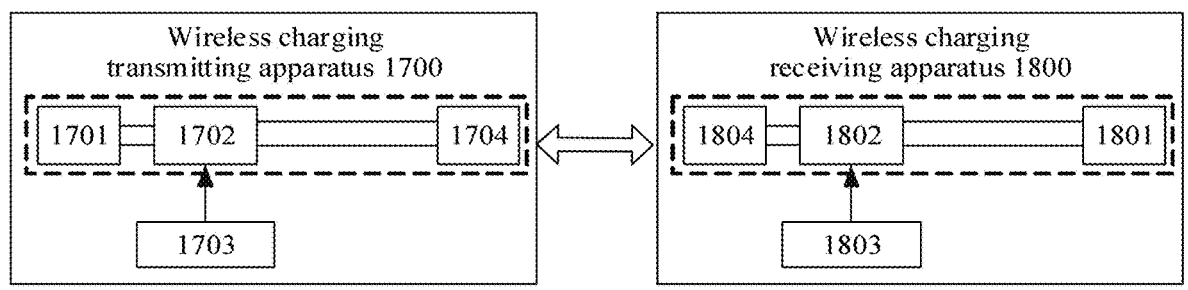
FIG. 44 is a schematic structural diagram of a wireless charging system according to an embodiment of this application.

FIG. 44 is a schematic structural diagram of a wireless charging system according to an embodiment of this application.

The wireless charging system includes the wireless charging transmitting apparatus 1700 shown in FIG. 40 or FIG. 41 and the wireless charging receiving apparatus 1800 shown in FIG. 42 or FIG. 43. The wireless charging transmitting apparatus is configured to wirelessly charge the wireless charging receiving apparatus.

An alternating-current signal transmitted by the coil module 1704 in the wireless charging transmitting apparatus 1700 generates a magnetic field, and the coil module 1804 in the wireless charging receiving apparatus 1800 can generate a voltage through magnetic coupling, so that the wireless charging transmitting apparatus 1700 can wirelessly charge the load 1801 in the wireless charging receiving apparatus 1800.

In this embodiment of this application, the wireless charging system includes a wireless charging transmitting apparatus and a wireless charging receiving apparatus. A coil module included in each of the wireless charging transmitting apparatus and the wireless charging receiving apparatus can reduce a circulating current loss and an eddy current loss of a coil in a wireless charging receiving process. Therefore, wireless charging efficiency of the wireless charging system can be increased. It should be noted that, when including the coil module in the coil module embodiment of this application, only one of the wireless charging transmitting apparatus and the wireless charging receiving apparatus still have functions of reducing the circulating current loss and the eddy current loss of the coil in the wireless charging receiving process, and increasing the wireless charging efficiency of the wireless charging system.

Based on the coil module provided in the foregoing embodiments, an embodiment of this application further provides a mobile terminal. The following provides specific description with reference to the accompanying drawings.

Figure 45:
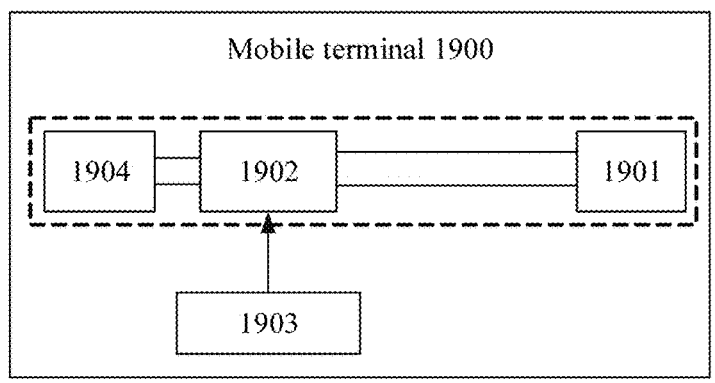
FIG. 45 is a schematic structural diagram of a mobile terminal according to an embodiment of this application.

FIG. 45 is a schematic structural diagram of a mobile terminal according to an embodiment of this application.

The mobile terminal provided in this embodiment includes a workload circuit 1901, a rectifier circuit 1902, a charging control unit 1903, and a coil module 1904 in any one of the foregoing coil module embodiments.

The coil module 1904 is configured to receive an alternating current in an alternating magnetic field manner.

An input end of the rectifier circuit 1902 is connected to the coil module 1904. The rectifier circuit 1902 is configured to rectify the alternating current into a direct current under control of the charging control unit 1903, and output the direct current to the workload circuit 1901.

Figure 46:
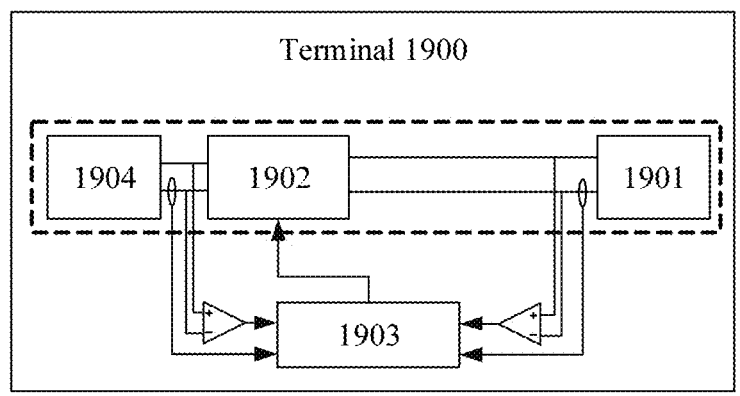
FIG. 46 is a schematic structural diagram of another mobile terminal according to an embodiment of this application.

Reference may be alternatively made to FIG. 46. FIG. 46 is a schematic structural diagram of another mobile terminal according to an embodiment of this application.

A charging control unit 1903 is connected to a workload circuit 1901 to detect a voltage and a current of the workload circuit 1901, is further connected to a coil module 1904 to detect a voltage and a current of the coil module 1904, and then controls a rectifier circuit 1902 based on the detected voltage and the detected current.

The mobile terminal may be an electronic device such as a mobile phone or a tablet computer.

The coil module 1904 included in the mobile terminal provided in this embodiment of this application can reduce a circulating current loss and an eddy current loss of a coil in a wireless charging process of the mobile terminal, and further increase wireless charging efficiency of the mobile terminal.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases only A exists, only B exists, and both A and B exist, where A and B may be singular or plural. The character "/" generally indicates an "or" relationship between the associated objects. "At least one of the following" or a similar expression thereof indicates any combination of the following, including any combination of one or more of the following. For example, at least one of a, b, or c may indicate a, b, c, "a and b", "a and c", "b and c", or "a, b, and c", where a, b, and c may be singular or plural.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A coil module comprising:
   a first planar coil winding comprising a plurality of turns of coils,
   wherein at least one turn of first coil of the turns of coils comprises a first cutting opening,
   wherein the first cutting opening divides the first coil into a first outer side part and a first inner side part along a first extension direction of the first coil,
   wherein a first target side part is the first outer side part or the first inner side part,
   wherein the first target side part comprises a first cutting groove,
   wherein the first cutting groove comprises a second extension direction that is the same as a third extension direction of the first target side part, and
   wherein a first width of the first cutting groove is less than or equal to a second width of the first cutting opening.

2. The coil module of claim 1, wherein at least one turn of second coil of the turns of coils comprises only the first cutting groove.

3. The coil module of claim 1, wherein the first target side part further comprises a second cutting groove, wherein the first cutting groove and the second cutting groove are arranged in parallel, and wherein a sum of the first width and a third width of the second cutting groove is less than or equal to the second width.

4. The coil module of claim 1, wherein the first cutting groove is a blind groove or a through groove.

5. The coil module of claim 1, further comprising a second planar coil winding comprising a second plurality of turns of coils, wherein at least one turn of third coil of the second turns of coils comprises a second cutting opening, wherein the second cutting opening divides the third coil into a second outer side part and a second inner side part along the first extension direction, wherein the second outer side part has a third connection end, wherein the second inner side part has a fourth connection end, wherein the first outer side part comprises a first connection end, wherein the first inner side part comprises a second connection end, and wherein the first connection end is coupled to the fourth connection end and the second connection end is coupled to the third connection end to implement either a series cross-connection between the first planar coil winding and the second planar coil winding or a parallel cross-connection between the first planar coil winding and the second planar coil winding.

6. The coil module of claim 5, wherein a second target side part is the second outer side part or the second inner side part, wherein the second target side part comprises a second cutting groove comprising a fourth extension direction that is the same as a fifth extension direction of the second target side part, and wherein a third width of the second cutting groove is less than or equal to a fourth width of the second cutting opening.

7. The coil module of claim 5, wherein the first cutting opening and the second cutting opening overlap in a planar projection direction, wherein a first overlapping proportion of the first cutting opening and the second cutting opening is greater than a first preset proportion, wherein the first cutting groove and the second cutting groove overlap in the planar projection direction, and wherein a second overlapping proportion of the first cutting groove and the second cutting groove is greater than a second preset proportion.

8. The coil module of claim 1, wherein the first cutting groove penetrates the first target side part along the third extension direction.

9. The coil module of claim 1, wherein the first target side part comprises a plurality of first cutting grooves distributed along the third extension direction, and wherein two adjacent first cutting grooves of the first cutting grooves are separated from each other.

10. The coil module of claim 9, wherein the first cutting grooves are evenly distributed on the first target side part along the second extension direction.

11. The coil module of claim 1, wherein the first cutting groove is from a laser or plasma.

12. A wireless charging transmitting apparatus comprising:
   a controller;
   a coil module, wherein the coil module comprises a first planar coil winding comprising a plurality of turns of coils, wherein at least one turn of first coil of the turns of coils comprises a first cutting opening, wherein the first cutting opening divides the first coil into a first outer side part and a first inner side part along a first extension direction of the first coil, wherein a first target side part is the first outer side part or the first inner side part, wherein the first target side part comprises a first cutting groove, wherein the first cutting groove comprises a second extension direction that is the same as a third extension direction of the first target side part, and wherein a first width of the first cutting groove is less than or equal to a second width of the first cutting opening, and an inverter circuit comprising:
an input end coupled to a direct current power supply; and
an output end coupled to the coil module;
wherein under control of the controller, the inverter circuit is configured to:
invert a direct current output from the direct current power supply into an alternating current; and
output the alternating current to the coil module; and
wherein the coil module is configured to transmit the alternating current in an alternating magnetic field manner.

13. The wireless charging transmitting apparatus of claim 12, wherein the first target side part comprises a second cutting groove, wherein the first cutting groove and the second cutting groove are arranged in parallel, and wherein a sum of the first width and a third width of the second cutting groove is less than or equal to the second width.

14. The wireless charging transmitting apparatus of claim 12, further comprising a second planar coil winding comprising a second plurality of turns of coils, wherein at least one turn of third coil of the second turns of coils comprises a second cutting opening, wherein the second cutting opening divides the third coil into a second outer side part and a second inner side part along the first extension direction, wherein the second outer side part has a third connection end, wherein the second inner side part has a fourth connection end, wherein the first outer side part comprises a first connection end, wherein the first inner side part comprises a second connection end, and wherein the first connection end is coupled to the fourth connection end and the second connection end is coupled to the third connection end to implement either a series cross-connection between the first planar coil winding and the second planar coil winding or a parallel cross-connection between the first planar coil winding and the second planar coil winding.

15. The wireless charging transmitting apparatus of claim 14, wherein a second target side part is the second outer side part or the second inner side part, wherein the second target side part comprises a second cutting groove comprising a fourth extension direction that is the same as a fifth extension direction of the second target side part, and wherein a third width of a single second cutting groove is less than or equal to a fourth width of a single second cutting opening.

16. The wireless charging transmitting apparatus of claim 12, wherein the first cutting groove penetrates the first target side part along the third extension direction.

17. A mobile terminal comprising:
a workload circuit;
a charging controller; and
a coil module, wherein the coil module comprises a first planar coil winding comprising a plurality of turns of coils, wherein the coil module is configured to receive an alternating current from a transmitter in an alternating magnetic field manner, wherein at least one turn of first coil of the turns of coils comprises a first cutting opening, wherein the first cutting opening divides the first coil into a first outer side part and a first inner side part along a first extension direction of the first coil, wherein a first target side part is the first outer side part or the first inner side part, wherein the first target side part comprises a first cutting groove comprising a second extension direction that is the same as a third extension direction of the first target side part, and wherein a first width of the first cutting groove is less than or equal to a second width of the first cutting opening; and a rectifier circuit comprising an input end coupled to the coil module, and wherein the rectifier circuit is configured to:
rectify the alternating current to a direct current under control of the charging controller; and
output the direct current to the workload circuit.

18. The mobile terminal of claim 17, wherein the first target side part comprises a second cutting groove, wherein the first cutting groove and the second cutting groove are arranged in parallel, and wherein a sum of the first width and a third width of the second cutting groove is less than or equal to the second width.

19. The mobile terminal of claim 17, further comprising a second planar coil winding comprising a second plurality of turns of coils, wherein at least one turn of third coil of the second turns of coils comprise a second cutting opening, wherein the second cutting opening divides the third coil into a second outer side part and a second inner side part along the first extension direction, wherein the second outer side part has a third connection end, wherein the second inner side part has a fourth connection end, wherein the first outer side part comprises a first connection end, wherein the first inner side part comprises a second connection end, and wherein the first connection end is coupled to the fourth connection end and the second connection end is coupled to the third connection end to implement either a series cross-connection between the first planar coil winding and the second planar coil winding or a parallel cross-connection between the first planar coil winding and the second planar coil winding.

20. The mobile terminal of claim 19, wherein a second target side part is the second outer side part or the second inner side part, wherein the second target side part comprises a second cutting groove comprising a fourth extension direction that is the same as a fifth extension direction of the second target side part, and wherein a third width of a single second cutting groove is less than or equal to a fourth width of a single second cutting opening.

* * * * *